US008831276B2

(12) United States Patent
Martinez et al.

(10) Patent No.: US 8,831,276 B2
(45) Date of Patent: Sep. 9, 2014

(54) MEDIA OBJECT METADATA ENGINE CONFIGURED TO DETERMINE RELATIONSHIPS BETWEEN PERSONS

(75) Inventors: Ronald Martinez, San Francisco, CA (US); Christopher Higgins, Portland, OR (US); Marc E. Davis, San Francisco, CA (US); Joseph O'Sullivan, Oakland, CA (US); Christopher T. Paretti, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 982 days.

(21) Appl. No.: 12/353,055

(22) Filed: Jan. 13, 2009

(65) Prior Publication Data

US 2010/0177938 A1  Jul. 15, 2010

(51) Int. Cl.
*G06K 9/00* (2006.01)
*H04W 4/00* (2009.01)

(52) U.S. Cl.
CPC ........ *G06K 9/00664* (2013.01); *G06K 9/00677* (2013.01)
USPC ............................ 382/103; 382/291; 455/433

(58) Field of Classification Search
CPC .............. G06K 9/00; G06T 7/00; H04W 4/00
USPC ......... 382/100, 103, 106–107, 155, 162, 168, 382/173, 181, 190–194, 199, 206, 209, 219, 382/232, 254, 274, 276, 182, 286–298, 305, 382/312; 707/10, 780; 455/556.1, 433; 705/14.53, 10; 396/56; 709/207
See application file for complete search history.

(56) References Cited

U.S. PATENT DOCUMENTS

| 7,373,389 B2* | 5/2008 | Rosenbaum et al. .......... 709/207 |
| 7,697,827 B2* | 4/2010 | Konicek .......................... 396/56 |
| 2005/0171955 A1* | 8/2005 | Hull et al. ....................... 707/10 |
| 2006/0251338 A1 | 11/2006 | Gokturk et al. |
| 2006/0251339 A1 | 11/2006 | Gokturk et al. |
| 2007/0081744 A1 | 4/2007 | Gokturk et al. |
| 2008/0082426 A1 | 4/2008 | Gokturk et al. |
| 2008/0177640 A1 | 7/2008 | Gokturk et al. |
| 2009/0023472 A1* | 1/2009 | Yoo et al. .................... 455/556.1 |

(Continued)

OTHER PUBLICATIONS

Nedos et al., "Gloss: Global Smart Spaces: Proximity Based Group Communications for Mobile Ad Hoc Networks," Version 0.2, Gloss Consortium, Oct. 2003, 31 page.

(Continued)

*Primary Examiner* — Seyed Azarian
(74) *Attorney, Agent, or Firm* — James J. DeCarlo; Greenberg Traurig, LLP

(57) ABSTRACT

A media object, such as an image file, a video file, or an audio file, is analyzed to determine relationships between persons associated with the media object, which may include persons captured in the media object and/or a person that captured the media object. A representation of a first person captured in a media object is detected. The media object is analyzed to determine at least one indicator of a relation between the first person and a second person associated with the media object. A relationship between the first person and the second person is predicted based at least on the determined at least one relation indicator. The media object may be monetized in various ways, such as by directing advertisements to persons associated with the media object, and/or to persons having social connections to the persons associated with the media object.

23 Claims, 23 Drawing Sheets

(56) References Cited

U.S. PATENT DOCUMENTS

| | | |
|---|---|---|
| 2009/0028434 A1* | 1/2009 | Vanhoucke et al. .......... 382/182 |
| 2009/0171766 A1* | 7/2009 | Schiff et al. ..................... 705/10 |
| 2009/0327906 A1 | 12/2009 | Heinemann |
| 2010/0070529 A1* | 3/2010 | Gokturk et al. ............... 707/780 |
| 2010/0082688 A1 | 4/2010 | Davis et al. |
| 2010/0179874 A1* | 7/2010 | Higgins et al. ............. 705/14.53 |
| 2010/0198674 A1 | 8/2010 | Boucard |
| 2010/0205057 A1 | 8/2010 | Hook et al. |
| 2010/0228558 A1 | 9/2010 | Corcoran et al. |
| 2010/0257028 A1 | 10/2010 | Hillerbrand |
| 2011/0029512 A1 | 2/2011 | Folgner et al. |

OTHER PUBLICATIONS

Brunato et al., "PILGRIM: A Location Broker and Mobility-Aware Recommendation System," Technical report DIT-02-0092, Universita di Trento, Oct. 2002, 8 pages.

Cascio, "Another Step Towards the Participatory Panopticon," Worldchanging.com, downloaded from <http://www.worldchanging.com/archives/003911.html on Dec. 18, 2008>, Dec. 23, 2006, 2 pages.

"Data Visualization Made Practical," TouchGraph, LLC, copyright 2007, downloaded from http://www.touchgraph.com/home.html on Dec. 18, 2008, 2 pages.

Non-final Office Action received for U.S. Appl. No. 12/353,086 dated Jul. 6, 2011, 52 pages.

* cited by examiner

1302 analyze the image to determine at least one of a distance between the first person and an image capturing device used by the second person to capture the image, a facial expression of the first person in the image, a body expression of the first person in the image, clothing worn by the first person in the image, an activity of the first person in the image, a portion of the first person visible in the image, or a total number of persons in the image

FIG. 13

1402 analyze the image to determine at least one of a distance between the first person and the second person in the image, a facial expression of the first person in the image, a facial expression of the second person in the image, an amount of contact between the first person and the second person in the image, a type of contact between the first person and the second person in the image, a body expression of the first person in the image, a body expression of the second person in the image, clothing worn by the first person in the image, clothing worn by the second person in the image, an activity of the first person in the image, an activity of the second person in the image, or a total number of persons in the image

FIG. 14

1502 analyze the audio object to determine an attitude of the first person, an attitude of the second person, an activity of the first person, or an activity of the second person

FIG. 15

1902
instrument the media object with a contact link for at least one of the first person, the second person, or a third person associated with at least one of the first person or the second person

2602 analyze the image to determine at least one of a distance between the brand and an image capturing device used by the person to capture the image, a proportion of the brand visible in the image, a total number of persons in the image, or a total number of brands in the image

FIG. 26

2702 analyze the image to determine at least one of a distance between the brand and the person in the image, a facial expression of the person in the image, an amount of contact between the brand and the person in the image, a body expression of the person in the image, an activity of the person in the image, a total number of persons in the image, or a total number of brands in the image

FIG. 27

2802 analyze the audio object to determine an attitude of the person or an activity of the person related to the brand

FIG. 28

2902 generate a social relations graph based on the predicted relationships, and that includes a node corresponding to each brand and to each person captured in the media object

MEDIA OBJECT METADATA ENGINE CONFIGURED TO DETERMINE RELATIONSHIPS BETWEEN PERSONS

BACKGROUND OF THE INVENTION

1. Field of the Invention

The present invention relates to the analysis of media objects, such as images, video recordings, and audio recordings, for social information, and to monetizing the same.

2. Background Art

Various devices exist that may be used to capture media objects, such as images, video, and audio. For example, digital cameras capable of capturing images and/or video exist in many forms, including in the form of dedicated cameras, as well being integrated into electronic devices such as cell phones, smart phones (such as Palm® Treo™ devices, Blackberry® devices, etc.), computers, and further types of electronic devices. Digital recorders capable of capturing audio also exist in many forms, including in the form of dedicated recorders, as well as being integrated into electronic devices such as cell phones, smart phones, computers, and further types of electronic devices.

Increasingly often, media objects captured by such devices are being shared among people. A person that captures a media object using a device may share the media object with other persons in various ways, including by emailing the captured media object to other persons, by uploading the captured media object to a website that enables other persons to interact with uploaded media objects, and in further ways. For example, some websites, such as Snapfish at www.snapfish.com and Flickr™ at flickr.com, are repositories for the sharing of images, and further websites, such as YouTube™ at youtube.com, enable the uploading of videos for sharing. The number of media objects that are currently network accessible is staggering, and is well into the billions. For instance, as of November 2008, Flickr™ indicated that it was the host for more than 3 billion images.

In many, if not most cases, media objects are not coded with information. For example, although an image of a group of people and/or objects may have been captured, the image is not typically coded with information (e.g., metadata) descriptive of the people and/or objects. Some tools, such as Flickr™, enable users to manually "tag" uploaded images with keywords, including enabling users to tag particular images as favorites, to name persons and/or objects present in an image, etc. However, such tagging takes user time and is not comprehensive, and thus relatively few media objects are coded with a significant amount of information regarding their content. As a result, the content of the majority of media objects cannot be analyzed or processed in a meaningful way or in a large scale manner, and any benefits that could be gained from analysis of the content of such media objects is lost.

What is desired are ways of efficiently coding media objects with information regarding their content to enable improved utilization of the content of the media objects, as well as to enable new opportunities related to the media objects.

BRIEF SUMMARY OF THE INVENTION

A media object, such as an image file, a video file, or an audio file, is analyzed to determine social relationships between persons associated with the media object. Such persons associated with the media object may include persons captured in the media object and/or a person that captured the media object. Any sort of relationship social relationship may be determined from analysis of the media object, including immediate family relationships (e.g., father-son, father-daughter, mother-son, husband-wife, partners, etc.), extended family relationships (e.g., uncle, aunt, grandmother, grandfather, etc.), and non-familial relationships (e.g., friends, boyfriend-girlfriend, enemies, etc.).

The media object may optionally be annotated (e.g., encoded, in the form of metadata) with the determined social relationship information. Furthermore, the media object may optionally be monetized based on the determined relationships, such as by directing advertisements to persons associated with the media object and/or to persons having social connections with the persons associated with the media object.

In one implementation, a method for processing a media object is provided. A representation of a first person captured in the media object is detected. The media object is analyzed to determine at least one indicator of a relation between the first person and a second person associated with the media object. A relationship between the first person and the second person is predicted based at least on the determined at least one relation indicator.

In an example, the media object includes an image captured by the second person, and a representation of the first person is captured in the image. In such case, the image may be analyzed to determine relation indicators for the first and second persons such as a distance between the first person and an image capturing device used by the second person to capture the image, a facial expression of the first person in the image, a body expression of the first person in the image, clothing worn by the first person in the image, an activity of the first person in the image, a portion of the first person visible in the image, or a total number of persons in the image.

In another example, the media object includes an image, and representations of both of the first and second persons are captured in the image. In such case, the image may be analyzed to determine relation indicators for the first and second persons such as a distance between the first person and the second person in the image, a facial expression of the first person in the image, a facial expression of the second person in the image, an amount of contact between the first person and the second person in the image, a type of contact between the first person and the second person in the image, a body expression of the first person in the image, a body expression of the second person in the image, clothing worn by the first person in the image, clothing worn by the second person in the image, an activity of the first person in the image, an activity of the second person in the image, or a total number of persons in the image.

In still another example, the media object includes an audio object, and the audio object includes recorded voice of the first person and recorded voice of the second person. In such case, the audio object may be analyzed to determine relation indicators for the first and second persons such as an attitude of the first person, an attitude of the second person, an activity of the first person, or an activity of the second person.

In another implementation, a system for processing media objects is provided. The system includes a media object metadata engine that includes a human representation detector, a relation determiner, and a relationship predictor. The human representation detector is configured to detect a representation of a first person captured in a media object. The relation determiner is configured to analyze the media object to determine at least one indicator of a relation between the first person and a second person associated with the media object. The relationship predictor is configured to predict a relationship between the first person and the second person based at least on the determined at least one relation indicator.

The media object metadata engine may further include a media object packager configured to associate data representative of the predicted relationship with the media object. The media object packager may be configured to instrument the media object with a contact link for at least one of the first person, the second person, or a third person associated with at least one of the first person or the second person.

The system may further include a media object monetization engine configured to select an advertisement based at least partially on the predicted relationship. The media object packager may be configured to associate the advertisement with the media object.

Computer program products are also described herein. The computer program products include a computer-readable medium having computer program logic recorded thereon for enabling media objects to be processed to predict relationships, and for monetizing of processed media objects, according to the implementations described herein.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 13-15 show example processes for analyzing media objects, according to embodiments of the present invention.

FIGS. 26-28 show example processes for analyzing media objects, according to embodiments of the present invention.

Figure 1:
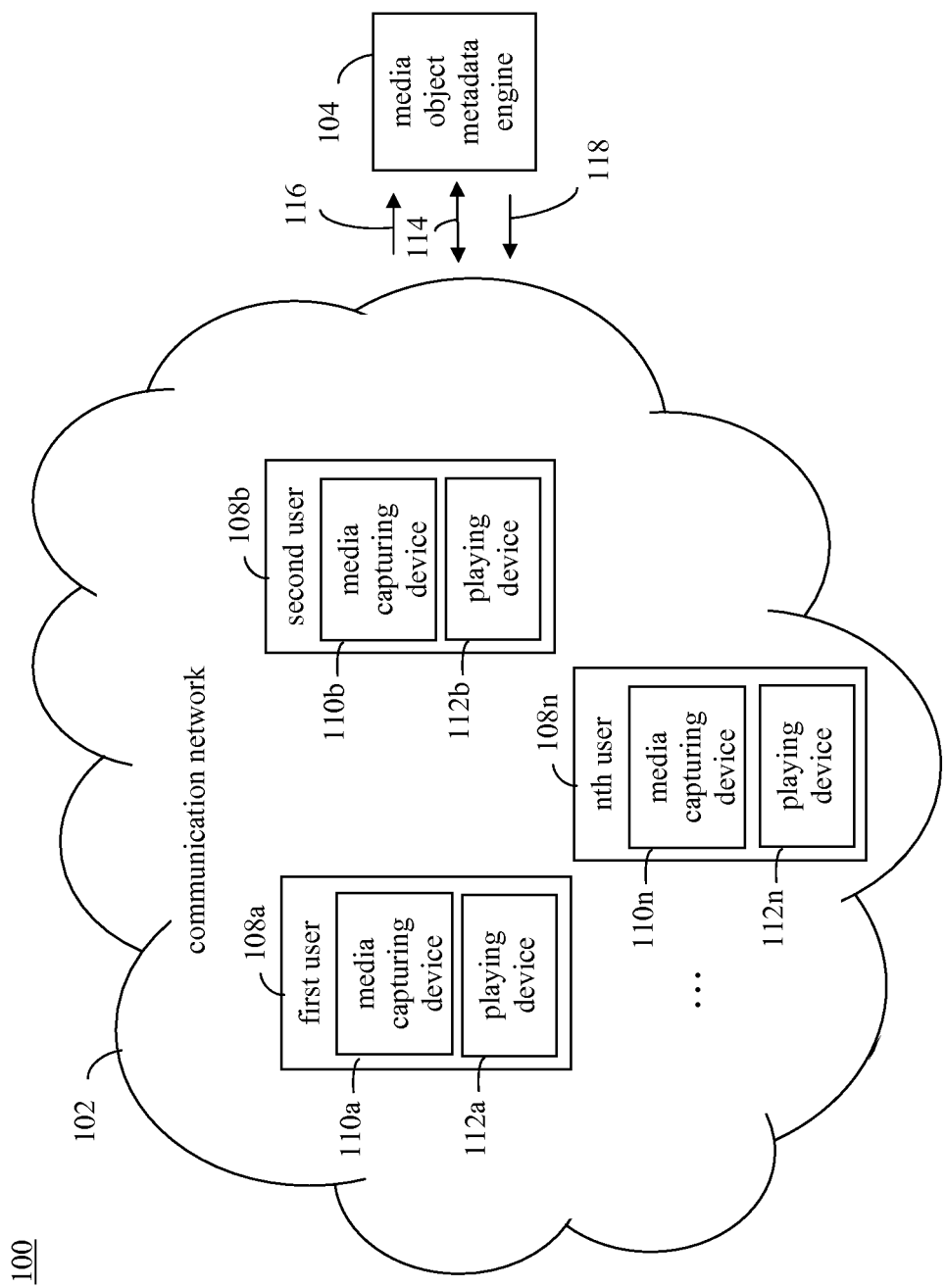
FIG. 1 shows a block diagram of a media object capture, processing, and sharing system, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention relate to the analysis of media objects, such as image, video, and audio objects (e.g., files), for relationship information. Numerous devices exist that may be used to capture media objects. For instance, digital cameras capable of capturing images and/or video exist in many forms, such as having the form of dedicated cameras, as well being integrated into electronic devices such as cell phones, smart phones (such as Palm® Treo™ devices, Blackberry® devices, etc.), computers, and further types of electronic devices. Digital recorders capable of capturing audio exist in many forms, such as having the form of dedicated recorders, as well as being integrated into electronic devices such as cell phones, smart phones, computers, and further types of electronic devices.

Increasingly often, media objects captured by such devices are being shared among people. A person that captured a media object using a device may share the media object with other persons in various ways, including by emailing the captured media object to other persons, or by uploading the captured media object to a website that enables other persons to interact with media objects. The number of media objects that are currently network accessible is staggering, apparently numbering well into the billions. However, in many, if not most cases, media objects are not coded with information regarding their content, including the identities of persons captured therein and their relationships. As a result, the content of the majority of media objects cannot be analyzed or processed in a meaningful way or in a large scale manner, and any benefits that could be gained from analysis of the content of media objects is therefore not attainable.

Embodiments of the present invention overcome the deficiencies of conventional media objects by enabling relationship information regarding persons and/or brands associated with media objects to be determined, and for this relationship information to be codified. Example embodiments of the present invention are described in detail in the following section.

II. Example Embodiments Analyzing Media Objects to Determine Relationships

Example embodiments are described for enabling relationship information regarding persons and/or brands associated with media objects to be determined. The example embodiments described herein are provided for illustrative purposes, and are not limiting. Further structural and operational embodiments, including modifications/alterations, will become apparent to persons skilled in the relevant art(s) from the teachings herein.

FIG. 1 shows a block diagram of a media object capture, processing, and sharing system 100, according to an example embodiment of the present invention. Media object capture, processing, and sharing system 100 enables users to capture and share media objects, and further enables the media objects to be processed to determine information regarding their contents. As shown in FIG. 1, system 100 includes a communication network 102 and a media object metadata engine 104. Media object metadata engine 104 is communicatively coupled to communication network 102 by a communication link 114. The elements of system 100 are described in detail below. Further description of various embodiments of system 100 is provided in subsequent sections.

Communication network 102 is a communication network that enables a community of users 108 (network participating persons) to communicate with each other. First-nth users 108a-108n are shown in communication network 102 in FIG. 1. Communication network 102 may include any number of users 108, including hundreds, thousands, or even millions of user 108. Users 108 may interact with each other in communication network 102 using corresponding electronic devices (e.g., computers, cell phones, etc.), as described in detail further below. Communication network 102 may include a personal area network (PAN), a local area network (LAN), a wide area network (WAN), or a combination of networks, such as the Internet.

Communication network 102 enables one or more ways for users 108 to interact with each other, including enabling communications between users 108 through one or more of blogging at websites, discussion groups, email, file sharing, instant messaging, online chat, video, voice chat, and/or other user communication mechanisms. For example, communications network 102 may enable users 108 to share media objects, such as image files, video files, and/or audio files, by any of these communication mechanisms. For instance, users may be enabled to upload media objects to particular websites for sharing, such as snapfish.com, flickr.com, shutterfly.com, youtube.com, etc.

In an embodiment, communication network 102 may contain or more social networks that couple together one or more of users 108 and enable sharing of media objects between them. For instance, social networking websites such as MySpace.com™ and Facebook™ enable users to create self-description pages (also referred to as a "profile page"), enable the users to link their pages with pages of friends and/or other persons, and enable the users to upload media objects for sharing.

As shown in FIG. 1, each user 108 has an associated media capturing device 110 and a media playing device 112. For instance, first user 108a has media capturing device 110a and media playing device 112a, second user 108a has media capturing device 110b and media playing device 112b, and nth user 108n has media capturing device 110n and media playing device 112n. Each user 108 may include more than one media capturing device 110 and/or media playing device 112 (note that all users 108 may not necessarily have both a media capturing device 110 and a media playing device 112). Furthermore, media capturing device 110 and media playing device 112 may be included in the same device or may be separate devices. Media capturing devices 110 are devices used by users 108 to capture media objects. Example media capturing devices 110 include digital cameras capable of capturing images and/or video, such as dedicated cameras and cameras integrated with electronic devices such as cell phones, smart phones (such as Palm® Treo™ devices, Blackberry® devices, etc.), computers (e.g., webcams), and further types of electronic devices. Example media capturing devices 110 further include digital recorders capable of capturing audio, such as dedicated recorders and recorders integrated into electronic devices such as cell phones, smart phones, computers, and further types of electronic devices. Media playing devices 112 are devices used by users 108 to play media objects. Example media playing devices 110 that may be capable of playing (e.g., displaying) images and/or video, and/or playing audio, include digital cameras, cell phones, smart phones, computers, media-object-ready televisions, mobile music devices (e.g., Apple iPod®), stationary music devices, etc.

Media object metadata engine 104 is configured to analyze media objects to determine information regarding their content. As shown in FIG. 1, media object metadata engine 104 receives a media object 116 over communication link 114. Media object 116 may have been captured and provided by a media capturing device 110 of one of users 108a-108n. Media object metadata engine 104 is configured to analyze media object 116 to determine information regarding its content. For example, through analysis of media object 116, media object metadata 104 may be configured to determine (e.g., with reasonable probability) the identity of one or more persons whose representations have been captured in media object 116, in the form of an image, a stream of images (in video), and/or in the form of audio (e.g., voice). Furthermore, media object metadata engine 104 may be configured to determine (e.g., predict, with reasonable probability) relationships between the one or more persons captured in media object 116 and/or between the one or more persons captured in media object 116 and a person (a user 108) that captured media object 116. Still further, media object metadata engine 104 may be configured to determine brands captured in media object 116, and to determine relationships between the persons associated with media object 116 and the brands.

Figure 2:
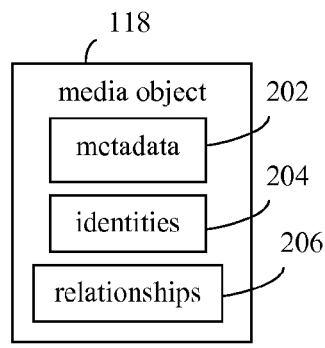
FIG. 2 shows a block diagram of media object, according to an example embodiment of the present invention.

In an embodiment, media object metadata engine 104 may generate a processed media object 118, which may have the determined identity information and/or relationship information associated therewith. For instance, FIG. 2 shows a block diagram of media object 118, according to an example embodiment. As shown in FIG. 2, media object 118 includes metadata 202, identities 204, and relationships 206. Metadata 202 is metadata (in addition to identities 204 and relationships 206) that is optionally included with media object 118 and/or may have been generated by media object metadata engine 104. For example, metadata 202 may include tags or other information added to media object 116 by the user 108 that captured media object 116. Identities 204 includes an indication of one or more identities of persons and/or brands captured in media object 116 that were determined by media object metadata engine 104. Identities 204 may include indications of identities in the form of names of persons, login IDs of persons, email addresses of persons, and/or other forms of identification. Relationships 206 includes an indication of one or more relationships between the persons whose representations have been captured in media object 116, between the person(s) whose representations were captured in media object 116 and a person that captured media object 116, and/or between persons and brands captured in media object 116. Relationships 206 may include any indication of person-to-person relationship such as friend (including degree of friend, e.g., close friends, best friends, casual friends, boyfriend, girlfriend, etc.), acquaintance, family member (including type of family relation, e.g., father, mother, son, daughter, sister, brother, aunt, uncle, grandmother, grandfather, cousin, spouse, partner, etc.), co-worker (e.g., boss, secretary, subordinate, etc.), a person having a common interest (including being members of a common organization, e.g., sailing club, Red Cross volunteer etc.), and/or further types of relationships. Alternatively, or in addition, relationships 206 may include any indication of level of a relationship between persons and brands, such as not interested, low interest, moderately interested, highly interested, etc.

As shown in FIG. 1, media object metadata engine 104 outputs processed media object 118. Media object 118 may be transmitted back to a user 108 having captured the associated media object 116, may be transmitted to others of users 108a-108n, may be posted at a website for sharing, and/or may be provided elsewhere. Media playing devices 112 of one or more of users 108 may be used to play media object 118, if desired.

Media object metadata engine 104 may be implemented in hardware, software, firmware, or any combination thereof. For example, media object metadata engine 104 may be implemented as computer code configured to be executed in one or more processors. Alternatively, media object metadata engine 104 may be implemented as hardware logic/electrical circuitry. An "engine" as referred to herein is meant to describe a software, hardware, or firmware (or combinations thereof) system, process or functionality that performs or facilitates the processes, features and/or functions described herein (with or without human interaction or augmentation).

Example embodiments for system 100, network 102, and media object metadata engine 104 are described in the following subsections.

A. Example Media Object Metadata Engine System and Network Embodiments

Figure 3:
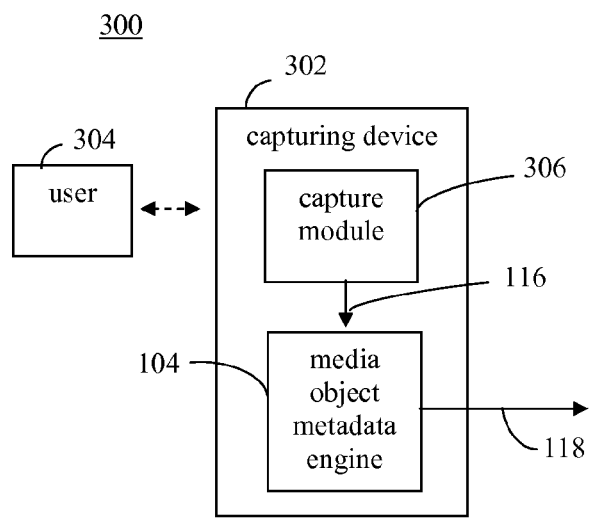
FIG. 3 shows a block diagram of a client-side system for implementing a media object metadata engine, according to an example embodiment of the present invention.
Figure 4:
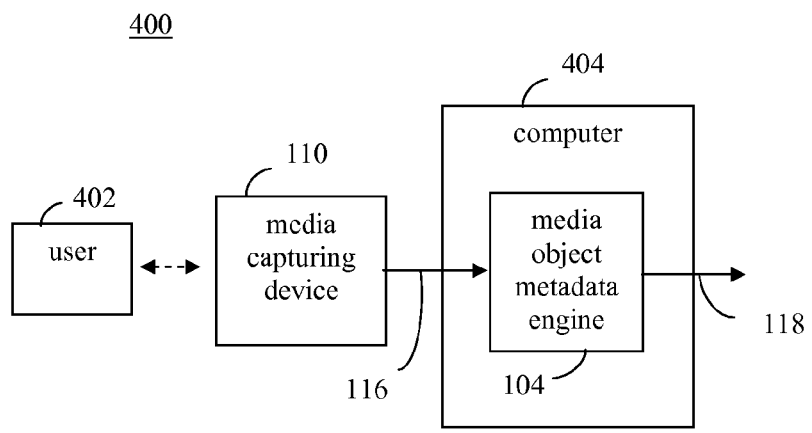
FIG. 4 shows a block diagram of a system for implementing a media object metadata engine, according to another example embodiment of the present invention.

Although shown in FIG. 1 as being accessible by users 108a-108n of network 102 through communication link 114, media object metadata engine 104 may be present in various locations, including being client-side accessible or server-side accessible. For instance, FIGS. 3 and 4 show further embodiments for media object metadata engine 104. FIG. 3 shows a block diagram of a client-side system 300 for implementing media object metadata engine 104, according to an example embodiment. As shown in FIG. 3, system 300 includes a media capturing device 302. Media capturing device 302 is an example of a media capturing device 110 shown in FIG. 1. Media capturing device 302 includes a capture module 306 and media object metadata engine 104. Capture module 306 includes functionality (e.g., image sensors, optics, image processing, a microphone, audio processing, etc.) of media capturing device 302 for capturing media objects. A user 304 interacts with media capturing device 302 to cause capture module 306 to capture media object 116 (e.g., in the form of an image file, a video file, an audio file, a combination thereof, etc.). Media object 116 is received by media object metadata engine 104 in media capturing device 302, which generates processed media object 118, which may include identities 204 and/or relationships 206 (as shown in FIG. 2). Thus, in an embodiment, media capturing device 302 may be configured to capture and analyze media objects to identify persons and/or brands, and/or to determine relationships. Subsequently, processed media object 118 may be transmitted from capturing device 302 to other users 108, media object servers, websites, etc., for use/consumption.

FIG. 4 shows a block diagram of a system 400 for implementing media object metadata engine 104, according to another example embodiment. As shown in FIG. 4, system 400 includes media capturing device 110 and a computer 404. A user 402 interacts with media capturing device 110 to capture media object 116. Media capturing device 110 interfaces with a computer 404, which contains media object metadata engine 104. Media object 116 is received by media object metadata engine 104 in computer 404, which generates processed media object 118. Thus, in an embodiment, media capturing device 110 may (locally) transfer media objects 116 to a computer (e.g., may "dock" or synchronize with computer 404) that is configured to analyze media objects to identify persons, brands, and/or relationships. Subsequently, processed media object 118 may be transmitted from computer 404 to other users 108, media object servers, websites, etc., for use/consumption.

Figure 5:
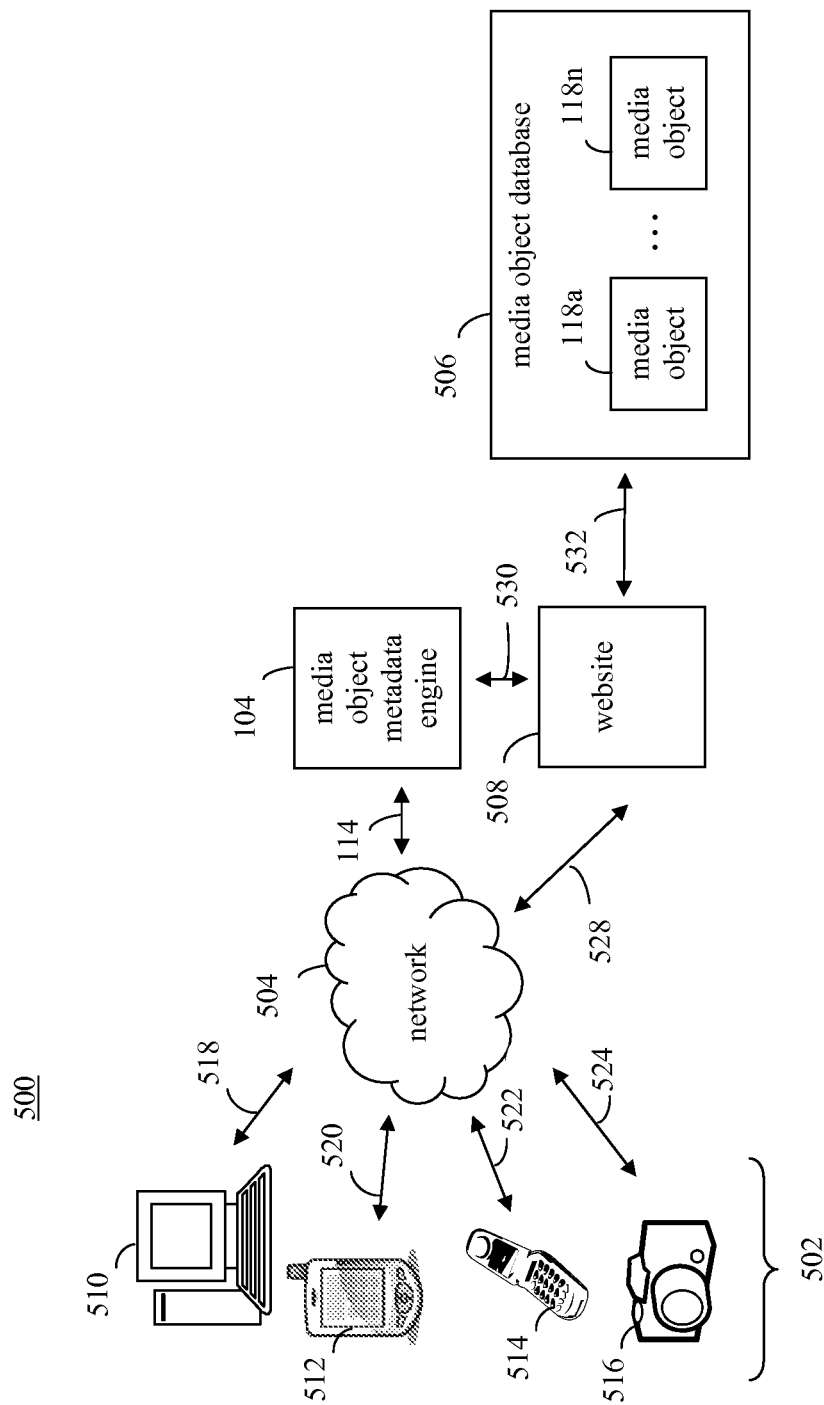
FIG. 5 shows a block diagram of a media object capture, processing, and sharing system, according to an example embodiment of the present invention.

FIG. 5 shows a block diagram of a media object capture, processing, and sharing system 500, according to another example embodiment of the present invention. System 500 is an example of system 100 shown in FIG. 1. As shown in FIG. 5, system 500 includes user devices 502, a network 504, media object metadata engine 104, a website 508, and a media object database 506. In FIG. 5, user devices 502 and network 504 represent an example embodiment of communication network 102 of FIG. 1.

As shown in FIG. 5, media object metadata engine 104 is communicatively coupled with user devices 502 through network 504. Network 504 may be a LAN, a WAN, or combination of networks, such as the Internet. Four example devices are shown as user devices 502 in FIG. 5, for purposes of illustration. User devices 502 may include hundreds, thousand, or even millions of user devices. Example user devices 502 include a desktop computer 510, a mobile computing device 512, a mobile phone 514, and a camera 516. Desktop computer 510 may be any type of stationary computer mentioned herein or otherwise known, including a personal computer. Mobile computing device 512 may be any type of mobile computing device, including a mobile computer (e.g., a Palm® device, a personal digital assistant (PDA), a laptop computer, a notebook computer, etc.) or mobile email device (e.g., a RIM Blackberry® device). Mobile phone 514 may be any type of mobile phone, including a cell phone. Camera 516 may be any type of camera capable of capturing still images and/or video, digital or otherwise. User devices 502 may include any number and type of devices that users may use to interact with website 508 and/or media object metadata engine 104, including or alternative to the example user devices shown in FIG. 5.

Each user device may communicate with media object metadata engine 104 and/or website 508 through a corresponding communication link. For example, as shown in FIG. 5, desktop computer 510 is communicatively coupled with network 504 through a first communication link 518, mobile computing device 512 is communicatively coupled with network 504 through a second communication link 520, mobile phone 514 is communicatively coupled with network 504 through a third communication link 522, and camera 516 is communicatively coupled with network 504 through a fourth communication link 522. Media object metadata engine 104 is shown communicatively coupled with network 504 through communication link 114. Website 508 (which may be hosted by a server or other computing device) is shown communicatively coupled with network 504 through a fifth communication link 528. In an embodiment, media object metadata engine 104 and website 508 may be hosted on a common server or set of servers. Communication links 114, 518, 520, 522, 524, and 528 may include any type or combination of communication links, including wired and/or wireless links, such as IEEE 802.11 wireless LAN (WLAN) wireless links, cellular network links, wireless personal area network (PAN) links (e.g., Bluetooth™ links), Worldwide Interoperability for Microwave Access (Wi-MAX) links, Ethernet links, USB links, etc.

As described above, media object metadata engine 104 receives media objects 116, and generates processed media objects 118, which may be transmitted to one or more users, including one or more user devices 502 shown in FIG. 5, and/or may be stored. In an embodiment, processed media objects 118 may be transmitted to website 508. Media objects 118 may be posted on one or more web pages of website 508 so that they may be interacted with (e.g., viewed, played, downloaded, etc.) by users at user devices 502. In such case, media objects 118 may be transmitted from media object metadata engine 104 to website 508 through a local link, through communication link 530, or through communication link 114, network 504, and communication link 528.

As shown in FIG. 5, media object database 506 is communicatively coupled to by a communication link 532 to website 508. Media object database 506 may be configured to store media objects 118 for website 508. For instance, as shown in the example of FIG. 5, media object database 506 stores media objects 118*a*-118*n*.

Website 508 may be any website where media objects may be posted and interacted with by users. In an embodiment, website 508 may be a website configured for media object sharing, such as snapfish.com, flickr.com, shutterfly.com, youtube.com, or may be a social networking website that enables the formation of communities of users, and manages the user communities. For example, website 508 may be a social networking service that exists on the World Wide Web, such as Facebook™, (www.facebook.com), LinkedIn™ (www.linkedin.com), MySpace.com™ (www.myspace.com), or any other suitable social network service. For instance, media object metadata engine 104 may be configured to process captured media objects, and to provide the processed media objects to be posted on profile pages of users of a social networking service represented by website 508.

B. Example Embodiments For Predicting Relationships Between Persons

Figure 6:
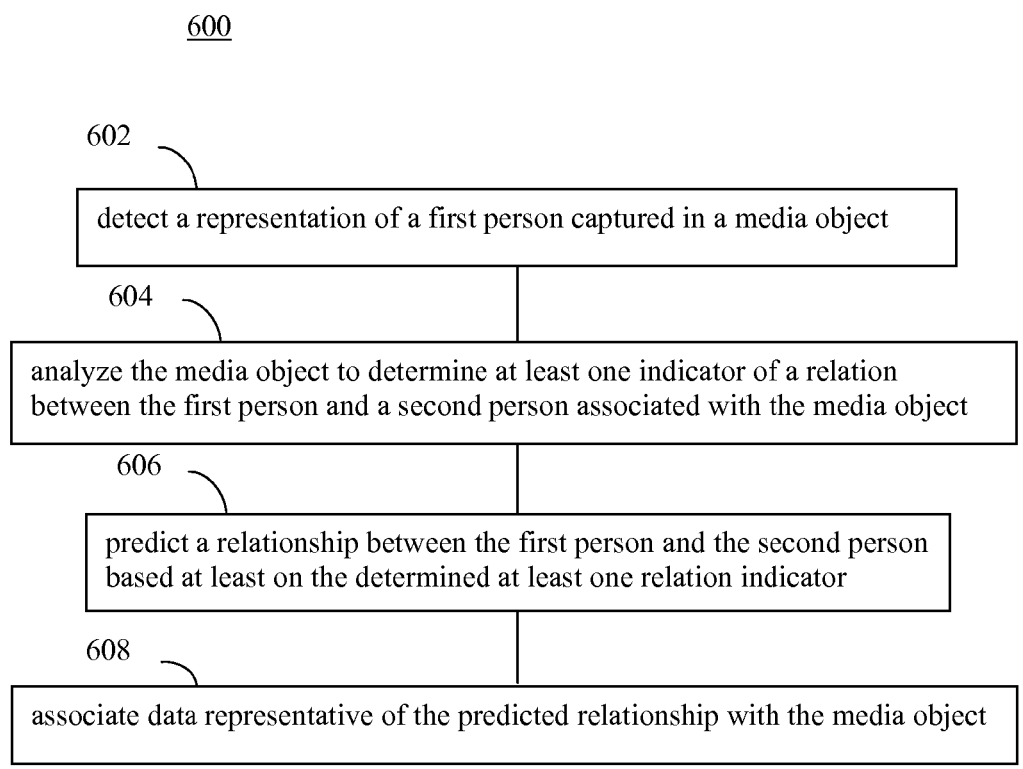
FIG. 6 shows a flowchart for processing a media object, according to an example embodiment of the present invention.
Figure 7:
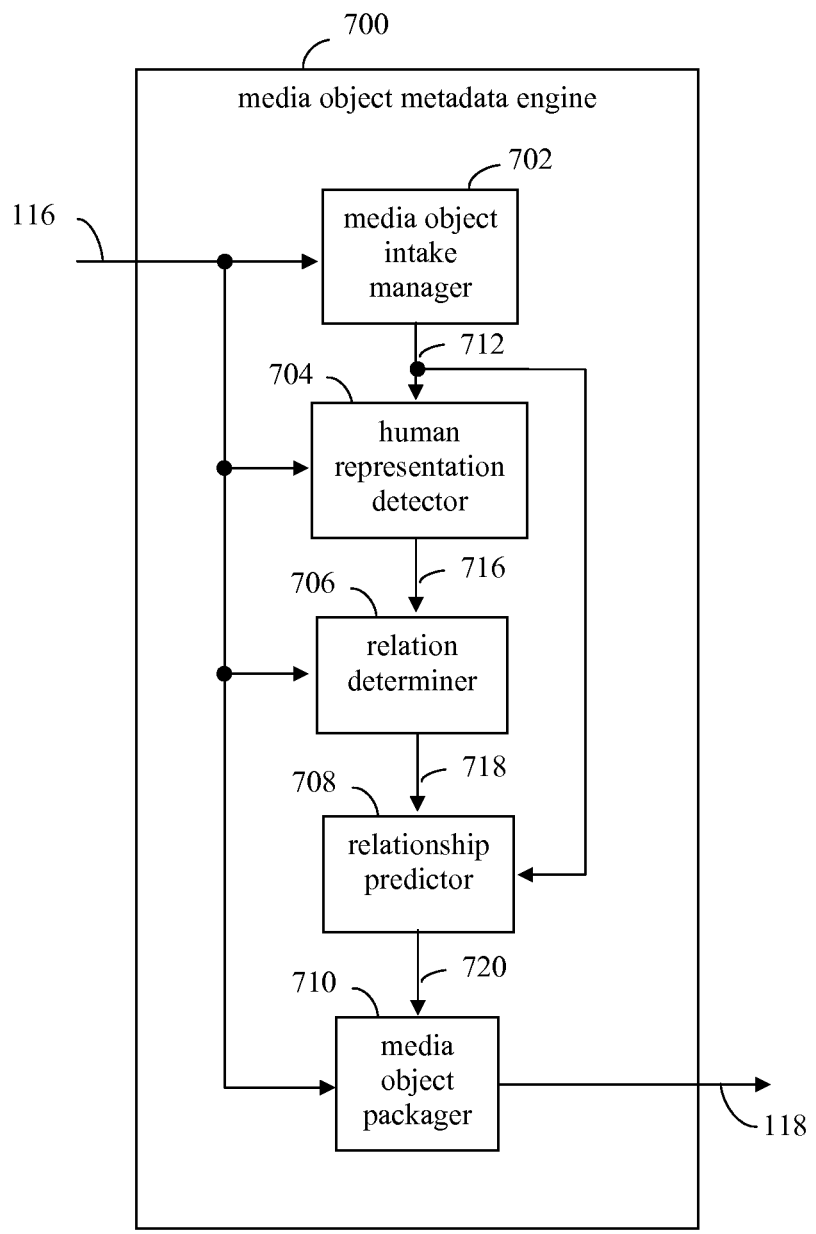
FIG. 7 shows a block diagram of a media object metadata engine, according to an example embodiment of the present invention.

As described above, media object metadata engine 104 may be configured to predict relationships between persons associated with media objects. Media object metadata engine 104 shown in FIGS. 1 and 3-5 may be implemented and may perform its functions in a variety of ways. For instance, FIG. 6 shows a flowchart 600 for processing a media object, according to an example embodiment of the present invention. Flowchart 600 may be performed by media object metadata engine 104, for example. For illustrative purposes, flowchart 600 is described with respect to FIG. 7. FIG. 7 shows a block diagram of a media object metadata engine 700, which is an example of media object metadata engine 104, according to an embodiment. As shown in FIG. 7, media object metadata engine 700 includes a media object intake manager 702, a human representation detector 704, a person-person relation determiner 706, a person-person relationship predictor 708, and a media object packager 710. Further structural and operational embodiments will be apparent to persons skilled in the relevant art(s) based on the discussion regarding flowchart 600. Flowchart 600 is described as follows.

Flowchart 600 begins with step 602. In step 602, a representation of a first person captured in a media object is detected. For example, in an embodiment, human representation detector 704 may be configured to perform step 602. As shown in FIG. 7, media object intake manager 702 receives media object 116. Media object manager 702 is configured to extract metadata (e.g., metadata 202 shown in FIG. 2) from media object 116. Such metadata may be stored in a predetermined location (e.g., a header, a body, a metadata section, etc.) of a file associated with media object 116, for example. The metadata typically includes post-capture interaction data associated with media object 116 or post-capture annotation of media object 116 performed by the operator of the capturing device, and/or by other person. Various examples of metadata are described elsewhere herein and/or may be otherwise known. Media object intake manager 702 generates metadata 712 (extracted from media object 116), which is received by human representation detector 704.

Figure 8:
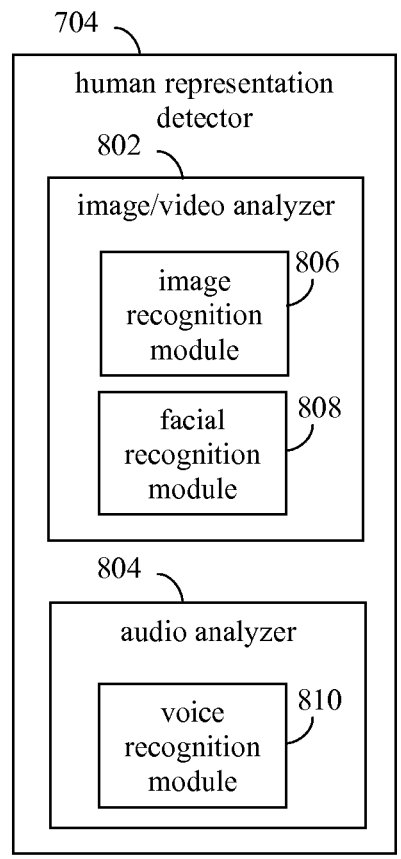
FIG. 8 shows a block diagram of a human representation detector, according to an embodiment of the present invention.

Human representation detector 704 is configured to analyze media object 116 to detect the presence of persons having representations (e.g., images, voice, etc.) captured therein. For example, human representation detector 704 may be configured to perform techniques of facial recognition, image recognition, and/or voice recognition to detect persons having representations captured in media object 116. For instance, FIG. 8 shows a block diagram of human representation detector 704, according to an embodiment of the present invention. As shown in FIG. 8, human representation detector 704 may include an image/video analyzer 802 and an audio analyzer 804. Either or both of image/video analyzer 802 and audio analyzer 804 may be present in embodiments. Image/video analyzer 802 is configured to analyze images, including analyzing images to detect representations of persons captured in the images. For example, image/video analyzer 802 may be configured to analyze image files (e.g., .GIF files, .JPG files, etc.). In an embodiment, image/video analyzer 802 may be configured to analyze a stream of images captured sequentially as video to detect representations of persons captured in the video stream (e.g., MPEG files, etc.).

For example, as shown in FIG. 8, image/video analyzer 802 may include an image recognition module 806 and a facial recognition module 808. Either or both of image recognition module 806 and facial recognition module 808 may be present in embodiments. Facial recognition module 808 may be present in image/video analyzer 802 to detect representations of persons in an image by detecting facial features of the persons. Techniques of facial recognition that may be used by facial recognition module 808 will be known to persons skilled in the relevant art(s), including recognition algorithms such as eigenface, fisherface, the Hidden Markov model, dynamic link matching, three-dimensional face recognition, skin texture analysis, etc.

Figure 9:
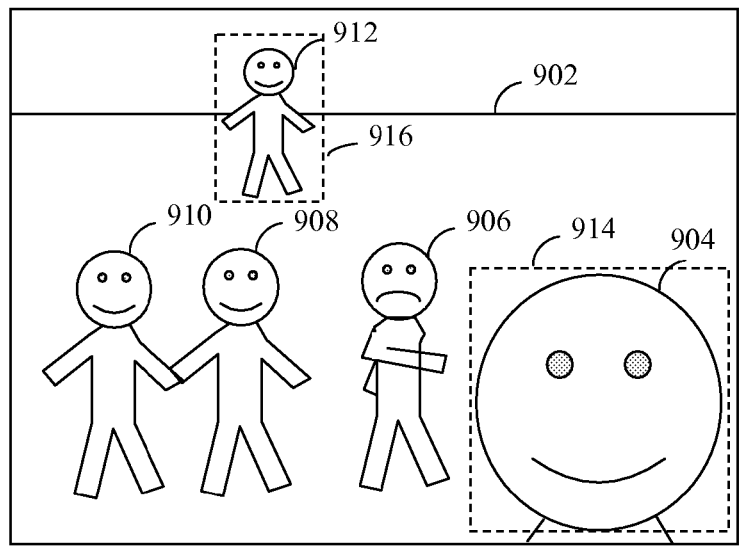
FIG. 9 illustrates an example captured image, according to an embodiment of the present invention.

For example, FIG. 9 illustrates an image 900, which may be an example of media object 116 received by human representation detector 704. As shown in FIG. 9, image 900 includes representations of five persons—persons 904, 906, 908, 910, and 912.

Facial recognition module 808 may be used by image/video analyzer 802 to detect representations of persons 904, 906, 908, 910, and 912 in image 900. Facial recognition module 808 may parse image 900 to locate one or more facial features, such as eyes, a nose, a mouth, hair, ears, etc., having a general facial arrangement to detect a face. For example, a region 914 is shown in FIG. 9 surrounding a face of person 904. Facial recognition module 808 may have detected facial features in region 914, such as eyes and a mouth of person 904, to indicate region 914 as including a face of a corresponding person (person 904). In this manner, facial recognition module 808 may detect one or more persons in image 900, including any one or more of persons 904, 906, 908, 910, and 912.

Furthermore, image recognition module 806 may be present in image/video analyzer 802 to detect representations of persons in an image by detecting one or more human body features. For example, with reference to FIG. 9, image recognition module 806 may be used by image/video analyzer 802 to detect representations of persons 904, 906, 908, 910, and 912 in image 900. Image recognition module 806 may parse image 900 to locate one or more human body features, such as a head, one or both arms, a torso, one or both legs, etc., that are interconnected in a general human body arrangement to detect a person. For example, a region 916 of image 900 is shown in FIG. 9 surrounding person 912. Image recognition module 806 may have detected bodily features in region 916, such as a head, arms, torso, and/or legs of person 912, to indicate region 916 as a body of a corresponding person (person 912). In this manner, image recognition module 806 may detect one or more persons in image 900, including any one or more of persons 904, 906, 908, 910, and 912. Techniques of image recognition that may be used by image recognition module 806 are well known to persons skilled in the relevant art(s), including computer vision techniques, pattern recognition techniques, etc.

Audio analyzer 804 is configured to analyze recordings (e.g., audio files such as .WAV files, etc.), which may or may not be accompanied by image and/or video, to detect representations of persons captured in audio form. For example, as shown in FIG. 8, audio analyzer 804 may include a voice recognition module 810 configured to recognize voices of persons in a recording. Each distinct recognized voice in the recording is recognized as a corresponding person. In this manner, voice recognition module 810 may detect one or more persons captured in a recording. Techniques of voice recognition that may be used by voice recognition module 810 to recognize distinct persons in a recording are well known to persons skilled in the relevant art(s), including automatic speech recognition or computer speech recognition algorithms such as acoustic modeling, language modeling, Hidden Markov Models, etc. Example commercially available dictation software tools capable of converting voice to text are provided by Microsoft Corporation (Microsoft Speech Server), Nuance Communications (VoCon), IBM Corporation (WebSphere Voice Server), etc.

After detecting one or more persons having representations captured in media object 116, human representation detector 704 may be configured to assign identities to each detected person. For example, each detected person may be assigned a generic identity, such as the identifiers person 1, person 2, person 3, person 4, and person 5 being assigned respectively to persons 904, 906, 908, 910, and 912 detected in image 900 of FIG. 9. In some cases, metadata 712 may include identifying information for one or more persons having representations captured in media object 116. For example, a person may have assigned tags to one or more persons having representations captured in media object 116 that provide full or partial names, e-mail addresses, or other identifiers. In such case, human representation detector 704 may be configured to assign the names provided in metadata 712 to the particular persons. Thus, one or more of the detected persons may be assigned generic identifiers while one or more others of the detected persons may be assigned actual names (or other provided identifiers). As shown in FIG. 7, human representation detector 704 generates detected person identifiers 716, which includes identifying information for one or more persons detected in media object 116, and may include information indicating a location of the detected persons in media object 116 (location in image, location in recording, etc.).

Referring back to FIG. 6, in step 604, the media object is analyzed to determine at least one indicator of a relation between the first person and a second person associated with the media object. For example, in an embodiment, relation determiner 706 in FIG. 7 may be configured to perform step 604. As shown in FIG. 7, relation determiner 706 receives media object 116 and detected person identifiers 716. Relation determiner 706 is configured to analyze media object 116 to determine relations between the detected persons indicated in detected person identifiers 716. The determined relations may be subsequently used to predict relationships between the persons, and/or to further ascertain their identities.

Figure 10:
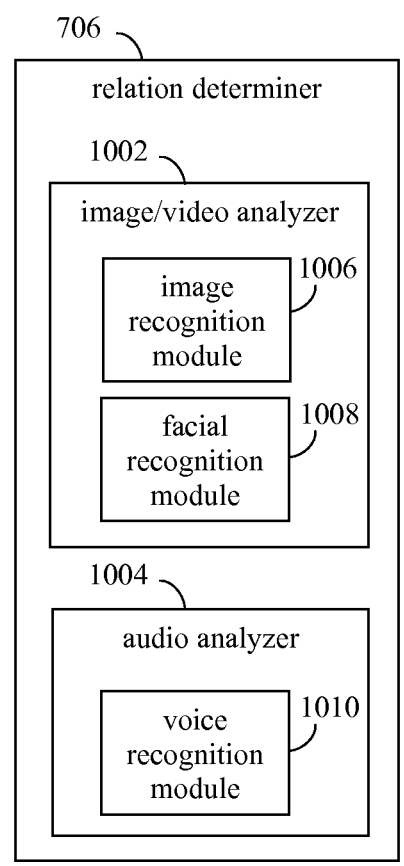
FIG. 10 shows a block diagram of a relation determiner, according to an embodiment of the present invention.

In embodiments, similar to human representation detector 704, relation determiner 706 may use image analysis techniques, video analysis techniques, and/or audio analysis techniques to determine indicators of relations between the identified persons. For instance, FIG. 10 shows a block diagram of relation determiner 706, according to an embodiment of the present invention. As shown in FIG. 10, relation determiner 706 may include an image/video analyzer 1002 and an audio analyzer 1004. Image/video analyzer 1002 and audio analyzer 1004 may respectively be the same as image/video analyzer 802 and audio analyzer 804 shown in FIG. 8, or may be separate entities. Either or both of image/video analyzer 1002 and audio analyzer 1004 may be present in embodiments. Image/video analyzer 1002 is configured to analyze images, including analyzing images to determine indications of relations between persons in the images. For example, image/video analyzer 1002 may be configured to analyze image files (e.g., .GIF files, .JPG files, etc.). In an embodiment, image/video analyzer 1002 may be configured to analyze a stream of images captured sequentially as video to determine indications of relations between persons captured in the video stream (e.g., MPEG files, etc.). Audio analyzer 1004 may be configured to analyze recordings (e.g., audio files such as .WAV files, etc.), which may or may not be accompanied by image and/or video, to determine indications of relations between persons captured in audio form. As shown in FIG. 10, image/video analyzer 1002 may include an image recognition module 1006 and a facial recognition module 1008, which may be similar or the same as image recognition module 806 and facial recognition module 808 shown in FIG. 8, respectively. Furthermore, as shown in FIG. 10, audio analyzer 1004 may include a voice recognition module 1010, which may be similar or the same as voice recognition module 810 shown in FIG. 8.

Figure 11:
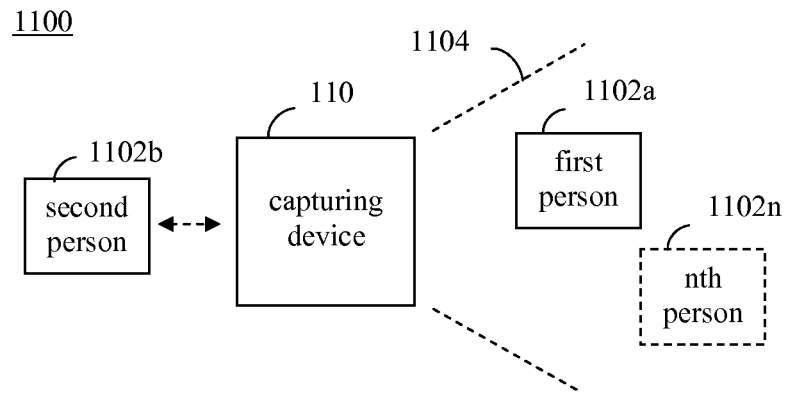
FIGS. 11 and 12 illustrate first and second configurations for capturing media objects, according to example embodiments of the present invention.

In embodiments, relation determiner 706 may be configured to determine indications of relations between variously situated persons associated with media object 116. For instance, FIG. 11 illustrates a first configuration 1100 for capturing a media object, according to an example embodiment. As shown in FIG. 11, configuration 1100 includes a capturing device 110, a first person 1102a, a second person 1102b, and optionally further persons (e.g., an nth person 1102n). In configuration 1100, second person 1102b operates capturing device 110. First person 1102a is in a field of capture 1104 of capturing device 110 (as is nth person 1102n), while second person 1102b is not in the field of capture 1104 of capturing device 110. For instance, capturing device 110 may be a camera, where first person 1102a is in the field of view of the camera, while second person 1102b is behind the camera. In another example, capturing device 110 may be an audio recorder, where first person 1102a speaks during the recording, while second person 1102b does not speak during the recording. Thus, in first configuration 1100, capturing device 110 captures a media object that includes a representation of first person 1102a, but not second person 1102b. With respect to first and second persons 1102a and 1102b, relation determiner 706 may be configured to determine indications of relations between first and second persons 1102a and 1102b by analysis of the media object, even though second person 1102b is not captured in the media object, but is instead associated with the media object by interacting with capturing device 110 to generate the media object.

Figure 12:
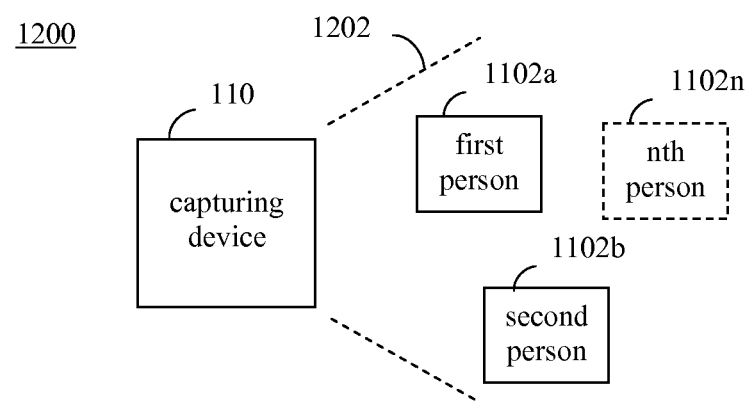

FIG. 12 illustrates a second configuration 1200 for capturing a media object, according to another example embodiment. As shown in FIG. 12, configuration 1200 includes capturing device 110, first person 1102a, second person 1102b, and optionally further persons (e.g., nth person 1102n). In configuration 1200, first person 1102a and second person 1102b are both in a field of capture 1202 of capturing device 110 (as is nth person 1102n). Thus, in configuration 1200, second person 1102b is associated with a media object captured by capturing device 110 by being captured in the media object along with first person 1102a. In FIG. 12, another person (not shown in FIG. 12) may be operating capturing device 110, capturing device 110 may be operating automatically, or second person 1102b may be operating capturing device 110 while still being present in field of capture 1202. For instance, capturing device 110 may be a camera, where second person 1102b holds the camera pointed in the direction of first and second persons 1102a and 1102b. In another example, capturing device 110 may be an audio recorder operated by second person 1102b, where first and second persons 1102a and 1102b both speak during the recording. In second configuration 1200, with respect to first and second persons 1102a and 1102b, relation determiner 706 may be configured to determine indications of relations between first and second persons 1102a and 1102b that are captured in the media object.

Relation determiner 706 is configured to analyze media object 116 for "relation indicators" which may be used to determine a relationship between persons associated with media object 116. Example relation indicators are described below. Relation determiner 706 may be configured to determine any number of indicators of relations between persons associated with media object 116.

For instance, in an embodiment, media object 116 may be an image. Referring to first configuration 1100 shown in FIG. 11, an image of first person 1102a may be captured in the image, while an image of second person 1102b is not captured in the image. For instance, second person 1102b may be operating capturing device 110. In such an embodiment, relation determiner 706 may perform step 1302 shown in FIG. 13 to determine one or more relation indicators. In step 1302, the image is analyzed to determine at least one of a distance between the first person and an image capturing device used by the second person to capture the image, a facial expression of the first person in the image, a body expression of the first person in the image, clothing worn by the first person in the image, an activity of the first person in the image, a portion of the first person visible in the image, or a total number of persons in the image. In embodiments, relation determiner 706 may determine any one or more of the relation indicators listed in step 1302, and/or further relation indicators, by analysis of an image (or video). The relation indicators recited in step 1302 are described as follows.

For instance, a distance between first person 1102a and capturing device 110 determinable by analysis of the image may be a relation indicator which may indicate a closeness of a relation between first person 1102a and second person 1102b. The distance may be determined by analysis of the size of first person 1102a in the image, for example. A greater distance may indicate a more distant (or non-existent) relation, while a lesser distance may indicate a closer relation. For example, referring to FIG. 9, because person 904 is close to the capturing device that captured image 900, person 904 may be considered to have a very close relation with the operator of the capturing device. Because persons 906, 908, and 910 are moderately close to the capturing device that captured image 900, persons 906, 908, and 910 may be considered to have a medium closeness of relation with the operator of the capturing device. Because person 912 is not close to (relatively far from) the capturing device that captured image 900, person 912 may be considered to have a more distant relation with the operator of the capturing device. Thus, an "out-ofimage distance" relation indicator between person 904 (e.g., first person 1102a) and the device operator (e.g., second person 1102b) may be "close," between each of persons 906, 908, and 910 and the device operator may be "medium," and between person 912 and the device operator may be "distant." Note that an out-of-image distance relation indicator may be provided as an actual determined distance value (e.g., in terms of inches, feet, or meters) or descriptive label (e.g., "close," "far," etc.).

Note that the relation indicators described herein may have descriptive labels ("close," "medium," "distant," etc.), numerical values, and/or any other suitable indicator values. Furthermore, if a value for a particular relation indicator cannot be discerned, the relation indicator can be assigned a null value.

Referring to FIG. 11, a facial expression of first person 1102a in the image may indicate a closeness of a relation between first person 1102a and second person 1102b. A frown, an expression of anger, disgust, or other negative facial expression may indicate a more distant or hostile relation. A passive facial expression (e.g., a blank face) may indicate little or no relation. A smile, an expression of pleasure, affection, or other positive facial expression may indicate a closer relation. For example, referring to FIG. 9, because each of persons 904, 908, 910, and 912 have smiling facial expressions, persons 904, 908, 910, and 912 may be considered to have a close relations with the operator of the capturing device. Because person 906 has a frowning facial expression, person 906 may be considered to have a more distant relation with the operator of the capturing device. Thus, a "facial expression" relation indicator for each of persons 904, 908, 910, and 912 may be "smiling," "positive," or other suitable indicator value, and for person 906 may be "frowning," "negative," or other suitable indicator value.

Referring to FIG. 11, a body expression of first person 1102a in the image may indicate a closeness of a relation between first person 1102a and second person 1102b. A closed posture, a negative (e.g., obscene) gesture, an arms folded posture, a facing away posture, or other negative body expression may indicate a more distant or hostile relation. A neutral posture may indicate little or no relation. An open posture, a waving motion, or other positive body expression may indicate a closer relation. For example, referring to FIG. 9, because each of persons 904, 908, 910, and 912 have open body expressions, persons 904, 908, 910, and 912 may be considered to have a close relations with the operator of the capturing device. Because person 906 has a turning-away body posture, person 906 may be considered to have a more distant relation with the operator of the capturing device. Thus, a "body expression" relation indicator for each of persons 904, 908, 910, and 912 may be "open," "positive," or other suitable indicator value, and for person 906 may be "closed," "turning-away," "negative," or other suitable indicator value.

Referring to FIG. 11, clothing worn by first person 1102a and/or an activity of first person 1102a in the image may indicate a closeness of a relation between first person 1102a and second person 1102b. Relation determiner 706 may be configured to determine clothing (shirt, pants, shoes, jacket, etc.) worn by first person 1102a in an image, and/or may be configured to determine an activity (e.g., a sport, work, a chore, shopping, cooking, etc.) undertaken by first person 1102a in the image, and to record this information as a "clothing' relation indicator and an "activity indicator," respectively.

Referring to FIG. 11, a portion of first person 1102a visible in the image may indicate a closeness of a relation between first person 1102a and second person 1102b. The particular portion of first person 1102a visible (e.g., emphasized) in the image may indicate a closeness of relation. For instance, if the face of first person 1102a is not visible in the image, this may indicate a more distant relation. A full body view of first person 1102a may indicate a medium to close relation. If a close-up of the face of first person 1102a is visible in the image, this may indicate a closer relation. For example, referring to FIG. 9, because each of persons 906, 908, 910, and 912 have full body views in image 900, persons 906, 908, 910, and 912 may be considered to have a medium relation with the operator of the capturing device. Because a close-up view of a face of person 904 is present in image 900, person 904 may be considered to have a close relation with the operator of the capturing device. Thus, a "body portion" relation indicator for each of persons 906, 908, 910, and 912 may be "full body," "medium," or other suitable medium closeness indicator value, and for person 904 may be "facial close up," "positive," or other suitable indicator value.

Referring to FIG. 11, a total number of persons present in the image may indicate a closeness of a relation between first person 1102a and second person 1102b. Relation determiner 706 may be configured to count the number of persons in the image, and to record this information as a "total population' relation indicator.

In the example of step 1302 (in FIG. 13), media object 116 is an image, and the second person was not captured in the image. In another embodiment, media object 116 may be an image, and the second person may be captured in the image. Referring to second configuration 1200 shown in FIG. 12, an image of first person 1102a and an image of second person 1102b may be captured in the image captured by capturing device 110. In such an embodiment, relation determiner 706 may perform step 1402 shown in FIG. 14 to determine one or more relation indicators. In step 1402, the image is analyzed to determine at least one of a distance between the first person and the second person in the image, a facial expression of the first person in the image, a facial expression of the second person in the image, an amount of contact between the first person and the second person in the image, a type of contact between the first person and the second person in the image, a body expression of the first person in the image, a body expression of the second person in the image, clothing worn by the first person in the image, clothing worn by the second person in the image, an activity of the first person in the image, an activity of the second person in the image, or a total number of persons in the image. In embodiments, relation determiner 706 may determine any one or more of the relation indicators listed in step 1402, and/or further relation indicators, by analysis of an image (or video). The relation indicators recited in step 1402 that were not described above with respect to step 1302 are described as follows.

For instance, a distance between first person 1102a and second person 1102b in the image may be a relation indicator which may indicate a closeness of a relation between first person 1102a and second person 1102b. The distance may be determined by the spacing of first person 1102a and second person 1102b and their relative sizes in the image, for example. A greater distance may indicate a more distant (or non-existent) relation, while a lesser distance may indicate a closer relation. For example, referring to FIG. 9, because person 908 is close to person 910, persons 908 and 910 may be considered to have a very close relation. Because person 904 is moderately distant from persons 906, 908, and 910, person 904 may be considered to have a medium closeness of relation with persons 906, 908, and 910. Because person 904 is not close to (relatively far from) person 912, persons 904 and 912 may be considered to have a more distant relation. Thus, an "in-image distance" relation indicator between persons 908 and 910 may be "close," between person 904 and each of persons 906, 908, and 910 may be "medium," and between persons 904 and 912 may be "distant." Additionally or alternatively, an in-image distance relation indicator may be provided as an actual determined distance value (e.g., in terms of inches, feet, or meters).

An amount of contact between first person 1102*a* and second person 1102*b* in the image may be a relation indicator which may indicate a closeness of a relation between first person 1102*a* and second person 1102*b*. A separation between them (no contact) may indicate a more distant (or non-existent) relation, some contact between them may indicate a medium to close relation, while a large amount of contact may indicate a closer relation. For example, referring to FIG. 9, persons 908 and 910 have a small amount of contact, and thus persons 908 and 910 may be considered to have a medium to close relation with each other, but distant relations with persons 904, 906, and 912. Persons 904, 906, and 912 are not in contact with each other, and thus may be considered to have more distant relations with each other. Thus, a "contact amount" relation indicator between persons 908 and 910 may be "medium," "close," or "in contact," between persons 908 and 910 and persons 904, 906, and 912 may be "distant" or "no contact," and between persons 904, 906, and 912 may be "distant" or no contact."

A type of contact between first person 1102*a* and second person 1102*b* in the image may be a relation indicator which may indicate a closeness of a relation between first person 1102*a* and second person 1102*b*. Incidental contact may indicate a more distant (or non-existent) relation, some forms of contact, such as shaking hands, may indicate a medium relation, while some types of contact, such as holding hands, hugging, sitting on lap, etc., may indicate a closer relation. For example, referring to FIG. 9, persons 908 and 910 are shown in image 900 as holding hands, and thus persons 908 and 910 may be considered to have a close relation with each other. Thus, a "contact type" relation indicator between persons 908 and 910 may be "close" or "holding hands."

The facial expression and body expression relation indicators described above with respect to step 1302 of FIG. 13 may also apply to step 1402 of FIG. 14. With regard to step 1402, whether the persons are facing each other or away from each other in the image, and/or other relative facial/body positioning in the image, may also be taken into account.

Note that these examples described above with respect to images may also apply to video. Furthermore, because a stream of images may be analyzed when media object 116 is a video file, a larger amount of relation information may be obtained (e.g., by analyzing each image in the video stream separately, and by correlating the images in the video stream).

The examples of steps 1302 (in FIG. 13) and step 1402 (in FIG. 14) relate to images. As described above, in another embodiment, media object 116 may be audio, and the second person may or may not be captured in the audio. Referring to second configuration 1200 shown in FIG. 12, audio (e.g., voice) related to first person 1102*a* and audio related to second person 1102*b* may be present in the audio recording captured by capturing device 110. In such an embodiment, relation determiner 706 may perform step 1502 shown in FIG. 15 to determine one or more relation indicators from the captured audio. In step 1502, the audio object is analyzed to determine an attitude of the first person, an attitude of the second person, an activity of the first person, or an activity of the second person. In embodiments, relation determiner 706 may determine any one or more of the relation indicators listed in step 1502, and/or further relation indicators, by analysis of an audio recording. The relation indicators recited in step 1502 are described as follows.

Referring to FIG. 12, an attitude of first person 1102*a* and/or an attitude of second person 1102*b* may be determined by relation determiner 706 by analyzing the audio captured in the recording. For instance, a tone, relative volume, and/or further audio characteristics of the speech/voice of first person 1102*a* and/or the voice of second person 1102*b* may indicate a closeness of a relation between first person 1102*a* and second person 1102*b*. Speech indicating negative feelings such as anger, frustration, contempt, etc., may be determined from analyzing the audio recording, and may indicate a more distant or hostile relation. Relatively passive or neutral speech may indicate little or no relation. Speech indicating positive feelings such as pleasure, affection, etc. may indicate a closer relation. An "attitude" relation indicator for each person may have indicator values such as "negative," "angry," "frustrated," "hostile," "happy," "affectionate," "positive," "neutral," "passive," or other suitable indicator value.

An activity of first person 1102*a* and/or an activity of second person 1102*b* may be determined by relation determiner 706 by analyzing the audio captured in the recording. For instance, analysis of the recorded audio may determine a sport, a type of work, a type of chore, or other activity in which first person 1102*a* and/or second person 1102*b* may be involved. An activity relation indicator generated for each person may have indicator values identifying a corresponding determined activity.

Referring back to FIG. 7, relation determiner 706 generates relation indicators 718, which includes the one or more relation indicators determined by relation determiner 706. Note that in embodiments, relation determiner 706 may determine further relation indicators related to demographics, such as determining an age and/or a sex of persons having representations captured in media object 116.

Referring back to FIG. 6, in step 606, a relationship between the first person and the second person is predicted based at least on the determined at least one relation indicator. For example, in an embodiment, relationship predictor 708 shown in FIG. 7 may be configured to perform step 606. Relationship predictor 708 receives relation indicators 718 and optionally receives metadata 712. Relationship predictor 708 is configured to determine relationships between the one or more persons having representations captured in media object 116 based on relation indicators 718. As shown in FIG. 7, relationship predictor 708 generates relationship predictions 720, which includes relationship predictions for one or more pairs of persons detected in media object 116, and may additionally include further identifiers (e.g., names, etc.) for the persons detected in media object 116 that are determined by relationship predictor 708.

For example, in an embodiment, relationship predictor 708 may predict a relationship between each pair of persons captured in media object 116 based on the relation indicators determined by relation determiner 706 that involve the pair. For example, referring to image 900 shown in FIG. 9, persons 904, 906, 908, 910, and 912 and the image capturing device operator are present, for a total of six persons. Each of the six persons may have a relationship with the five other persons shown in image 900, for a total of 30 relationships present between persons 904, 906, 908, 910, and 912 and the device operator. Relationship predictor 708 may be configured to predict each of the 30 relationships based on the corresponding relation indicators.

For example, in FIG. 9, with respect to person 904 (first person) and the person operating the image capturing device (second person), relation indicators 718 may include the following relation indicators (or equivalent values) based on analysis of media object 116:

out-of-image distance="close"
    facial expression of person 904="smiling"
    body portion of person 904="facial close up"
    number of persons present=5

Based on these relation indicators for person 904 and the device operator, relationship predictor 708 may predict that person 904 and the device operator have a very close relationship, such as being one of "close friends," "partners," "husband-wife," etc. Relationship predictor 708 may take into account further demographic information, such as age and sex that may be ascertainable from image 900 or from metadata 712. Note that a sex of the device operator is not ascertainable from image 900. Thus, from image 900 alone, predictions of "husband," "wife," "girlfriend," "boyfriend," etc., that need identification of a sex of each person cannot reliably be made with regard to the device operator (unless such information is provided as metadata 712). With regard to age, for example, if person 904 is not old enough to be a "partner" or in a "husband-wife" relationship, the relationship may be predicted to be "close friends." Furthermore, relationship predictor 708 may take into account relationships predicted (or known from metadata 712) regarding the other persons in image 900 in predicting the relationship between person 904 and the device operator. For example, if person 904 is predicted to be a "partner," "husband," "wife," or "girlfriend," with another person in image 900, the relationship between person 904 and the device operator may be predicted to be "close friends," rather than "partner," "husband," "wife," or "girlfriend," since these are already precluded.

In another example, with respect to persons 906 and 908, relation indicators 718 may include the following relation indicators (or equivalent values) based on analysis of media object 116:

in-image distance between persons 906 and 908="close"
    facial expression of person 906="frowning"
    facial expression of person 908="smiling"
    amount of contact="none"
    body expression of person 906="twisting"
    body expression of person 908="open"
    body portion of person 906="full body"
    body portion of person 908="full body"
    activity of person 906="walking away"
    activity of person 908="standing still"
    number of persons present=5

Based on these relation indicators for persons 906 and 908, relationship predictor 708 may predict that persons 906 and 908 do not have a close relationship, such as being one of "distant friends" "enemies," etc. As described above, relationship predictor 708 may take into account further demographic information, such as age and sex that may be ascertainable from image 900 or from metadata 712, and may have a bearing on the relationship.

Thus, different types of relationships may be predicted for pairs of persons based on various combinations of values for relation indicators, modified according to age, sex, and/or further demographics. Examples relationships which may be predicted are listed below in Table 1, along with some example values for some relation indicators which may be used to predict the relationships between pairs of persons:

TABLE 1

| relationship | example relation indicator values | Further relation indicator factors |
| --- | --- | --- |
| sister, brother | out-of-image distance = "close" to "medium"<br>in-image distance = "close" to "medium"<br>amount of contact = "medium" to "low"<br>type of contact = "friendly"<br>facial expression(s) = "smiling"<br>body portion(s) = "full body"<br>activity(s) = "playing" or engaging in other activity together (especially for relatively younger ages)<br>ages are relatively close together | relative sexes between a pair of persons can be used to determine which of "sister" or "brother" is appropriate<br>if ages are relatively younger, the relation indicator values may be less positive; if ages are relatively older, the relation indicator values may be more positive |
| uncle, aunt | out-of-image distance = "close" to "medium"<br>in-image distance = "close" to "medium"<br>amount of contact = "medium"<br>type of contact = "friendly"<br>facial expression(s) = "smiling"<br>body portion(s) = "full body"<br>attitude(s) = "positive"<br>ages are appropriately spaced apart | relative sexes and ages between a pair of persons can be used to determine which of "uncle" or "aunt" is appropriate |
| father, mother, son, daughter | out-of-image distance = "close"<br>in-image distance = "close"<br>amount of contact = "high"<br>type of contact = "holding hands," "hugging"<br>facial expression(s) = "smiling," "affectionate"<br>body portion(s) = "full body"<br>attitude(s) = "positive"<br>ages are appropriately spaced apart | relative sexes and ages between a pair of persons can be used to determine which of "mother" or "father" is appropriate |
| friend | out-of-image distance = "close" to "medium"<br>in-image distance = "close" to "medium"<br>amount of contact = "medium" to "low"<br>type of contact = "friendly"<br>facial expression(s) = "smiling" | |

TABLE 1-continued

| relationship | example relation indicator values | Further relation indicator factors |
|---|---|---|
| | body portion(s) = "full body"<br>activity(s) = "playing" or engaging in other activity together (especially for relatively younger ages)<br>ages are relatively close together | |
| partner,<br>spouse,<br>husband,<br>wife | out-of-image distance = "close"<br>in-image distance = "close"<br>amount of contact = "high"<br>type of contact = "holding hands," "hugging"<br>facial expression(s) = "smiling," "affectionate"<br>body portion(s) = "facial close up"<br>number of persons present = relatively low value<br>attitude(s) = "positive" | sexes can be used to determine which of "husband" or "wife" is appropriate |
| girlfriend,<br>boyfriend | out-of-image distance = "close"<br>in-image distance = "close"<br>amount of contact = "high"<br>type of contact = "holding hands," "hugging"<br>facial expression(s) = "smiling," "affectionate"<br>body portion(s) = "facial close up"<br>number of persons present = relatively low value<br>attitude(s) = "positive" | sexes can be used to determine which of "girlfriend" or "boyfriend" is appropriate |
| co-worker | out-of-image distance = "medium"<br>in-image distance = "medium"<br>amount of contact = "none"<br>facial expression(s) = "smiling" to "passive"<br>body portion(s) = "full body"<br>clothing = "business attire" | |
| acquaintance | out-of-image distance = "medium" to "far"<br>in-image distance = "medium" to "Far"<br>amount of contact = "none"<br>facial expression(s) = "passive"<br>body portion(s) = "full body" | |
| enemy | out-of-image distance = "medium" to "far"<br>in-image distance = "medium" to "Far"<br>amount of contact = "none"<br>facial expression(s) = "frowing," "anger," "negative"<br>body portion(s) = "less than full body" | |

Note that that further types of relationships between pairs of persons may be predicted by relationship predictor 708 than those shown in Table 1. Furthermore, further relation indicators, and alternative values of the relation indicators, than those shown in Table 1 may be used by relationship predictor 708 to predict relationships.

In an embodiment, relation indicators 718 may be provided to relationship predictor 708 in the form of textual expressions (as described in the above example of Table 1). In such an embodiment, relationship predictor 708 may process relation indicators 718 using natural language processing techniques, or may convert the textual expressions into numerical form reflective of the relations indicators for processing. Alternatively, relation indicators 718 may be provided to relationship predictor 708 in numerical form, and relationship predictor 708 may process relation indicators 718 in their numerical form. In an embodiment, relationship predictor 708 may process relation indicators according to an expression. For instance, each relation indicator may be weighted, some related relation indicators may be combined, and the weighted and/or combined relation indicators may be summed to generate a relationship prediction for a pair of persons. In further embodiments, relationship predictor 708 may process relation indicators 718 in alternative ways to predict relationships.

Figure 16:
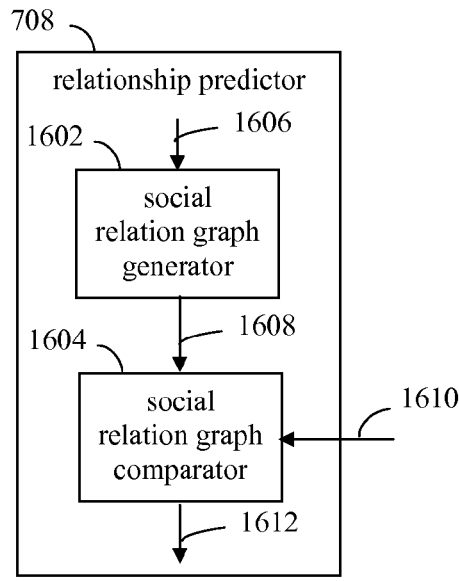
FIG. 16 shows a block diagram of a relationship predictor, according to an example embodiment of the present invention.

After relationship predictor 708 has predicted relationships between each pair of persons in media object 116, relationship predictor 708 may optionally generate a social relation graph that indicates the predicated relationships for media object 116. For example, FIG. 16 shows a block diagram of relationship predictor 708, according to an embodiment. As shown in FIG. 16, relationship predictor 708 may include a social relation graph generator 1602. In an embodiment, social relation graph generator 1602 may be configured to perform step 1702 shown in FIG. 17. In step 1702, a social relations graph is generated based on the predicted relationships, and includes a node corresponding to each person captured in the media object. For example, as shown in FIG. 16, social relation graph generator 1602 receives predicted relationships 1606, and generates a social relations graph 1608. For instance, FIG. 18 shows a portion of a social relations graph 1800, according to an embodiment. Social relations graph 1800 is a portion of an example social relations graph that may be generated with regard to image 900 shown in FIG. 9. As shown in FIG. 18, social relations graph 1800 includes six nodes 1802*a*-1802*f* corresponding to persons 904, 906, 908, 910, and 912, and the device operator associated with image 900. Furthermore, social relations graph 1800 includes five relationship links 1804*a*-1804*e* which indicate relationships between the device operator and each of persons 904, 906, 908, 910, and 912. A more complete form of social relations graph 1800 may include relationship links between persons 904, 906, 908, 910, and 912, for a total of 30 relationship links (five relationship links from each person to the other five persons). Relationship links between each of persons 904, 906, 908, 910, and 912 are not shown in FIG. 18 for ease of illustration.

In the example of FIG. 18, first relationship link 1804*a* indicates a husband-wife relationship between the device operator and person 904. Second relationship link 1804*b* indicates an enemies relationship between the device operator and person 906. Third relationship link 1804*c* indicates a brother-sister relationship between the device operator and person 908. Fourth relationship link 1804*d* indicates a brother-in-law relationship between the device operator and person 910. Fifth relationship link 1804*d* indicates no relationship between the device operator and person 912. The relationships shown in FIG. 18 are provided for purposes of illustration and are not intended to be limiting. Although shown for illustrative purposes in graphical form in FIG. 18, social relations graph 1800 may be represented in numerical and/or any other suitable form.

In embodiments, after relationship predictor 708 has predicted relationships between each pair of persons in media object 116, relationship predictor 708 may determine identities for those persons in media object 116 that are not already identified by human representation detector 704. In an embodiment, based on the predicted relationships, relationship predictor 708 may determine from metadata 712 identities of one or more persons. Furthermore, in an embodiment, relationship predictor 708 may receive user information regarding any identified persons of media object 116 that may be used to determine the identifies of the remaining persons. Such user information may be user information associated with user accounts, including social networking accounts, of the identified users, or any further sources of user information accessible by relationship predictor 708. Examples of such user information are provided in a subsection further below.

For example, referring to FIG. 18, the device operator may have tagged media object 116 with a name (e.g., Joe Smith) or other identifier for the device operator, and this identifier may be present in metadata 712. Relationship predictor 708 may access user information for the device operator using the identifier (e.g., accessing a user account, a social networking account, etc.). The user information may indicate a name or other identifier for a sister of the device operator. The identifier for the sister (e.g., Susie Jones) of the device operator may be assigned to person 908, because person 908 was predicted to have a brother-sister relationship with the device operator. Furthermore, user information for the identified sister may now be accessed, which may provide a name (e.g., Tom Jones) or other identifier for her spouse—person 910—who was predicted to have a brother-in-law relationship with the device operator. In this manner, user information for each identified person of media object 116 may be accessed to determine identifying information for even further persons of media object 116.

Further techniques may be used by relationship predictor 708 to identify persons. For example, in an embodiment, as shown in FIG. 16, relationship predictor 708 may include a social relation graph comparator 1604. Social relation graph comparator 1604 receives social relations graph 1608 (e.g., social relations graph 1800) generated by social relation graph generator 1602, and may perform steps 1704 and 1706 shown in FIG. 17. In step 1704, the generated social relations graph is compared with a plurality of network-based social relations graphs to determine a matching network-based social relations graph. For example, as shown in FIG. 16, social relation graph comparator 1604 may receive network-based social relations graph information 1610. Network-based social relations graph information 1610 contains information on any number of network-based social relations graphs of any size, including any number of nodes and relationship links. Social relation graph comparator 1604 is configured to compare social relations graph 1608 with network-based social relations graph information 1610 to determine a social network (or portion of a social network) having a matching shape (e.g., same number of nodes and relationship links, same predicted relationships, and same person identifiers for any that are known) with social relations graph 1608. In step 1706, an identity of at least person captured in the media object is determined from the determined matching network-based social relations graph. If a social network match is found, any persons of social network graph 1608 that are not yet identified, but are identified in the matching social network, can be assigned the names/identifiers from the matching social network. As shown in FIG. 16, social relation graph comparator 1604 generates a social relations graph 1612, which is a version of social relations graph 1608 with one or more additional persons identified therein.

Note that relationship predictor 708 may use additional information to predict relationships and/or determine identities of persons in media object 116. For example, an identification of a location in which media object 116 was captured may be used to further enable prediction of relationships and/or determination of identities. For instance, a person who captured media object 116 may add location information to media object 116 as a tag or in other manner, and the location information may be included in metadata 712. Alternatively, image recognition techniques (e.g., image recognition module 806 in FIG. 8 or image recognition module 1006 in FIG. 10) or audio analysis techniques (e.g., audio analyzer 804 in FIG. 8 or audio analyzer 1004 in FIG. 10) may be used to process media object 116 to determine the location. By processing location information (e.g., a workplace, a store, a travel destination, an event location, etc.), relationship predictions can be made even more accurately.

Furthermore, an identification of a time at which media object 116 was captured may be used to further enable prediction of relationships and/or determination of identities. For instance, a person who captured media object 116 may add time information to media object 116 as a tag or in other manner, or the time information may be added automatically by the media capturing device, and the time information may be included in metadata 712. By processing time information (e.g., morning, afternoon, evening, weekend, weekday, work hours, rush hour, etc.), relationship predictions can be made even more accurately.

Referring back to FIG. 6, in step 608, data representative of the predicted relationship is associated with the media object. Step 608 is optional. In an embodiment, media object packager 710 shown in FIG. 7 may be configured to perform step 608. As shown in FIG. 7, media object packager 710 receives media object 116 and predicted relationships 720. Media object packager 710 is configured to package together media object 116 and predicted relationships 720 to form processed media object 118 (e.g., as shown for media object 200 in FIG. 2). For example, in an embodiment, predicted relationships 720 may be associated with media object 118 as metadata, or in any other manner, as would be known to persons skilled in the relevant art(s). In this manner, processed media object 118 is encoded with identity and relationship information, which may be passed with processed media object 118 to users, websites, and/or further consumers of media objects.

In an embodiment, media object packager 710 may further process media object 116 to generate processed media object 118. For example, media object packager 710 may use user information associated with the persons identified in media object 116 to further process media object 116. For instance, in an embodiment, media object packager 710 may perform step 1902 shown in FIG. 19 to further process media object 116. In step 1902, the media object may be instrumented with a contact link for at least one of the first person, the second person, or a third person associated with at least one of the first person or the second person. According to step 1902, media object packager 710 may instrument media object 116 with one or more contact links in generating processed media object 118. Example contact links include an email address, a link to a webpage (e.g., a social network profile webpage, a personal web page, etc. Contact links can be provided for persons captured in the media object, such as first person 1102a shown in FIG. 11, a person capturing the media object, such as second person 1102b shown in FIG. 11, or further persons associated with first and second persons 1102a and 1102b. For example, the further persons and their contact links may be identified in user information associated with first person 1102a and/or second person 1102b, such as "friends," "family," "co-workers," etc., identified in a "friends lists" of either of first and second persons 1102a and 1102b.

Figure 20:
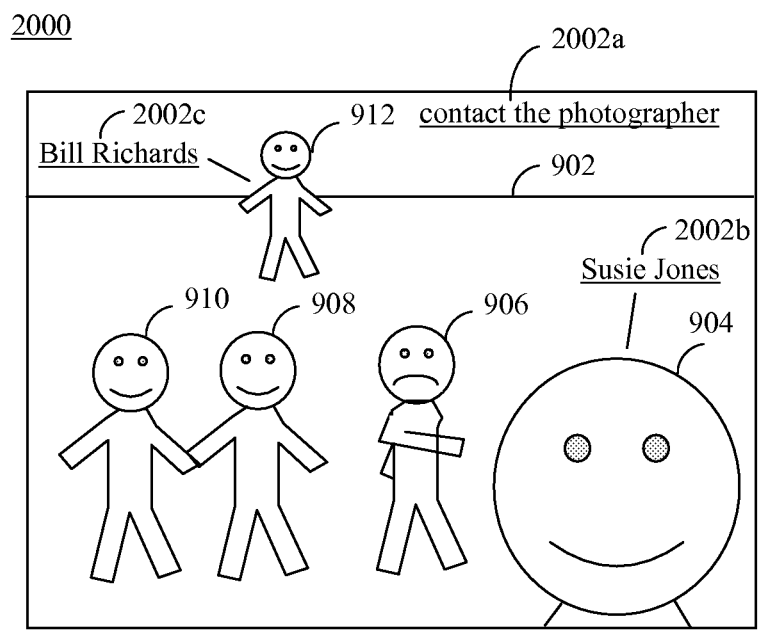
FIG. 20 shows an instrumented image, according to an example embodiment of the present invention.

For instance, FIG. 20 shows an image 2000, which is a processed version of image 900, according to an example embodiment. Processed image 2000 is an example of processed media object 118, with three contact links 2002a, 2002b, and 2002c instrumented therein. Contact link 2002a is a contact link for the operator of the capturing device ("the photographer") that captured image 900 of FIG. 9. Contact link 2002b is a contact link for person 904 ("Susie Jones"). Contact link 2002c is a contact link for a friend of person 904 ("Bill Richards"). Contact links 2002 may be positioned anywhere in image 2000, and may have any form, including as standard textual links (as shown in FIG. 20), as icons, etc. Contact links 2002 may always be visible, or may become visible by interacting with (e.g., hovering a mouse pointer over) the corresponding person in image 2000. By selecting (e.g., clicking on) a contact link, a contact mechanism may be initiated for contacting the corresponding person, including initiating an email tool, a phone call, an instant message, etc.

Figure 17:
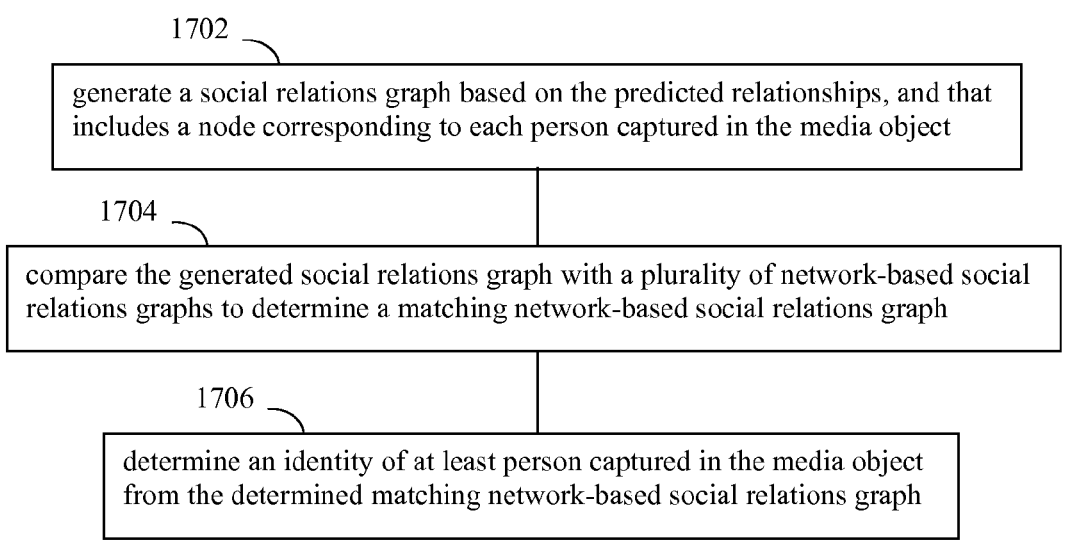
FIG. 17 shows a flowchart for generating and using a social relations graph, according to example embodiments of the present invention.
Figures 18, 19:
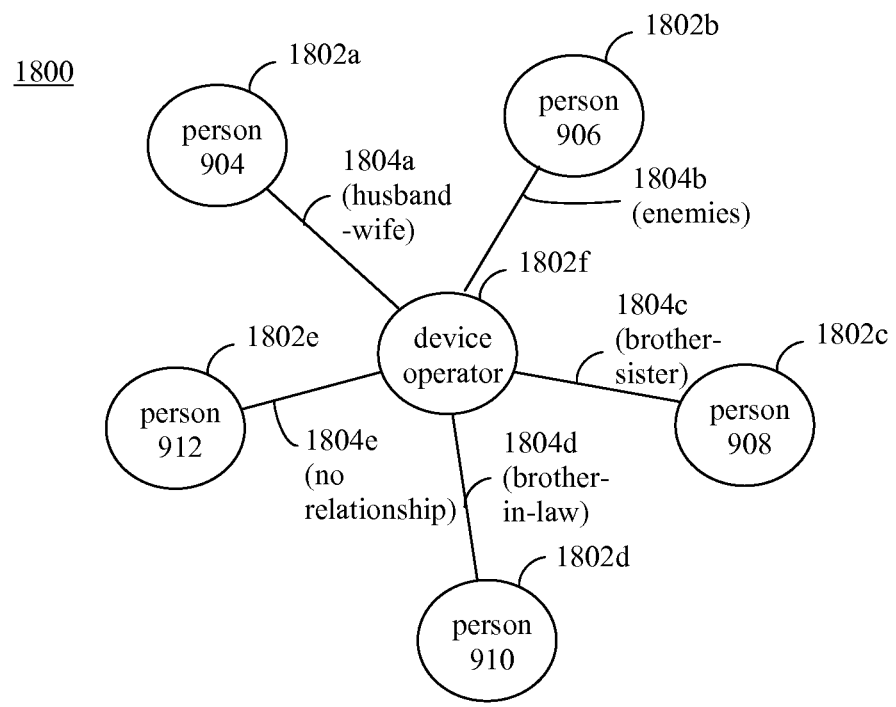
FIG. 18 shows a portion of a social relations graph, according to an example embodiment of the present invention.
FIG. 19 shows a process for instrumenting a media object, according to an example embodiment of the present invention.

Media object intake manager 702, human representation detector 704, relation determiner 706, relationship predictor 708, and media object packager 710 shown in FIG. 7, human representation detector of FIG. 8 (including image/video analyzer 802, image recognition module 806, facial recognition module 808, audio analyzer 804, and/or voice recognition module 810), relation determiner 706 of FIG. 10 (including image/video analyzer 1002, image recognition module 1006, facial recognition module 1008, audio analyzer 1004, and/or voice recognition module 1010), relationship predictor 708 shown in FIG. 16 (including social relation graph generator 1602 and/or social relation graph comparator 1604), flowchart 600 of FIG. 6, step 1302 of FIG. 13, step 1402 of FIG. 14, step 1502 of FIG. 15, flowchart 1700 of FIG. 17, and/or step 1902 of FIG. 19 may be implemented in hardware, software, firmware, or any combination thereof, including being implemented as computer code configured to be executed in one or more processors and/or as hardware logic/electrical circuitry.

C. Example Embodiments For Predicting Relationships Between Brands and Persons

A brand is a product, service, or any other real world entity or information object which has an identity. As described above, media object metadata engine 104 may be configured to predict relationships between brands and persons associated with media objects. Media object metadata engine 104 shown in FIGS. 1 and 3-5 may be implemented and may perform its functions in a variety of ways, including in ways similar to those described above with respect to predicting relationships between persons associated with media objects. Example embodiments are described as follows for predicting relationships between brands and persons associated with media objects. Embodiments enable relationships to be predicted between brands and persons associated with media objects.

Figure 21:
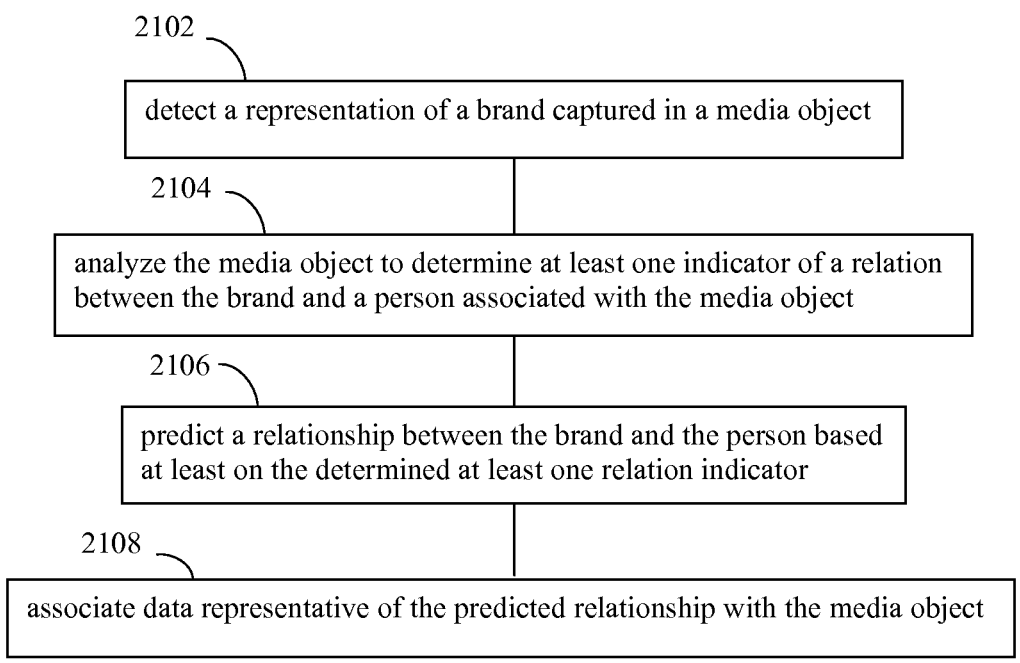
FIG. 21 shows a flowchart for processing a media object, according to an example embodiment of the present invention.
Figure 22:
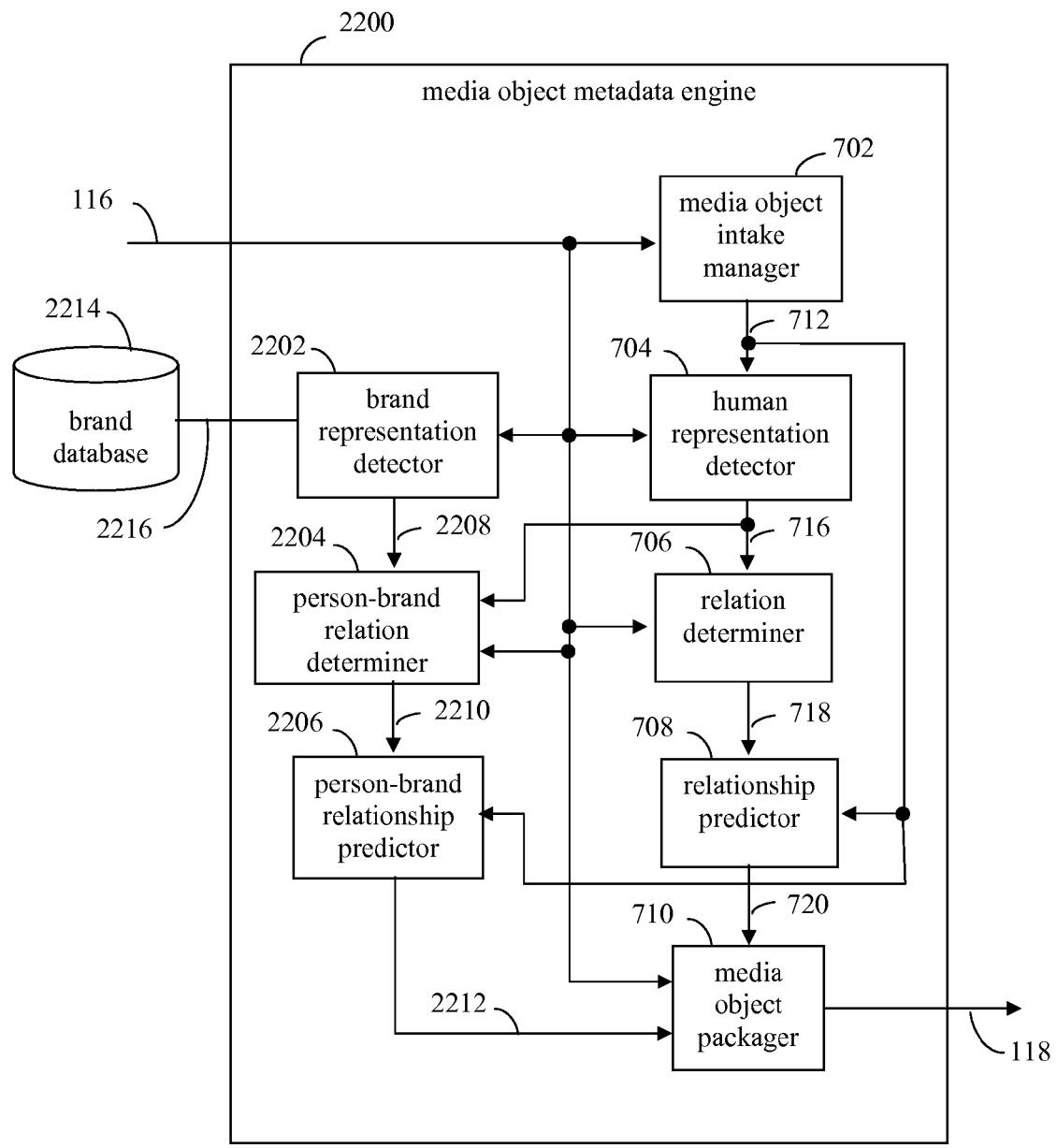
FIG. 22 shows a block diagram of a media object metadata engine, according to an example embodiment of the present invention.

For instance, FIG. 21 shows a flowchart 2100 for processing a media object, according to an example embodiment of the present invention. Flowchart 2100 may be performed by media object metadata engine 104, for example. For illustrative purposes, flowchart 2100 is described with respect to FIG. 22. FIG. 22 shows a block diagram of a media object metadata engine 2200, which is an example of media object metadata engine 104, according to an embodiment. As shown in FIG. 22, media object metadata engine 2200 is similar to media object metadata engine 700 shown in FIG. 7. Media object metadata engine 2200 includes media object intake manager 702, human representation detector 704, relation determiner 706, relationship predictor 708, and media object packager 710, and further includes a brand representation detector 2202, a person-brand relation determiner 2204, and a person-brand relationship predictor 2206. The additional elements of engine 2200 (relative to engine 700) are described as follows. Further structural and operational embodiments will be apparent to persons skilled in the relevant art(s) based on the discussion regarding flowchart 2100. Flowchart 2100 is described as follows.

Flowchart 2100 begins with step 2102. In step 2102, a representation of a brand captured in a media object is detected. For example, in an embodiment, brand representation detector 2202 may be configured to perform step 2102. Brand representation detector 2202 is configured to analyze media object 116 to detect the presence of brands having representations (e.g., logos, branded objects, etc.) captured therein. For example, brand representation detector 2202 may be configured to perform techniques of image recognition and/or audio analysis to detect brands having representations captured in media object 116. For instance, brand representation detector 2202 may include or may access image/video analyzer 802 and audio analyzer 804 shown in FIG. 8 to detect brands. Image/video analyzer 802 is configured to analyze images, including analyzing images to detect representations of brands captured in the images, in a similar fashion as described above for detecting persons.

In an embodiment, as shown in FIG. 22, brand representation detector 2202 may access a brand database 2214. Brand database 2214 is a database of brand images 2216, such as textual or image-based logos (e.g., the CocaCola® logo, etc.) of brands, images of objects representative of brands (e.g., models of cars of various brands, such as BMW, Honda, Ford, etc.), and further images indicative of brands. Image/video analyzer 802 may access brand images 2216 at brand database 214, and image recognition module 806 may be configured to parse media object 116 to search for the accessed brand images 2216. A representation of a brand associated with a particular brand image is detected in a media object 116 if a match occurs.

Figure 23:
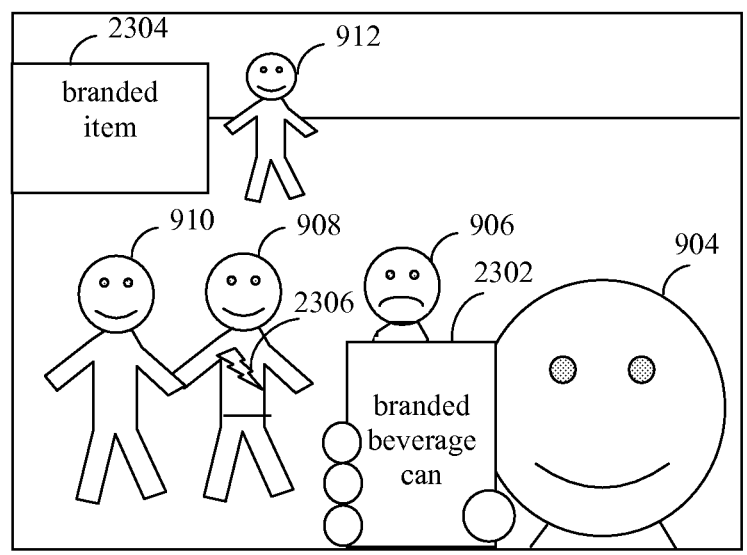
FIG. 23 illustrates an example captured image, according to an embodiment of the present invention.

For example, FIG. 23 illustrates an image 2300, which may be an example of media object 116 received by brand representation detector 2202. As shown in FIG. 23, image 2300 is generally similar to image 900 shown in FIG. 9, including representations of persons 904, 906, 908, 910, and 912. Image recognition module 806 may be used by image/video analyzer 802 to detect representations of brands in image 2300. Image recognition module 806 may parse image 2300 to locate one or more brand logos, such as a brand logo 2306 on a shirt of person 908, and one or more branded objects, such as a branded beverage can 2302 (e.g., branded by a soft drink manufacturer, such as Pepsi Co.) and a branded item 2304 (e.g., a branded automobile). Techniques of image recognition that may be used by image recognition module 806 to parse an image or video for patterns, such as brands, are well known to persons skilled in the relevant art(s) and/or are mentioned elsewhere herein.

Likewise, brand representation detector 2202 may include or may access audio analyzer 804 to detect brands. Audio analyzer 804 may receive audio information regarding brands (e.g., audio recordings of brand jingles, etc.) from brand database 2214 to detect representations of brands captured in audio form, in a similar fashion as described above for detecting persons. Techniques of audio recognition that may be used by audio analyzer 804 to recognize distinct sounds, including brand related audio, in a recording will well known to persons skilled in the relevant art(s) and/or are mentioned elsewhere herein.

After detecting one or more brands having representations captured in media object 116, brand representation detector 2202 generates detected brand identifiers 2208, which includes identifying information (e.g., brand names) for one or more brands detected in media object 116, and may include information indicating a location of the detected brands in media object 116 (location in image, location in recording, etc.).

Referring back to FIG. 21, in step 2104, the media object is analyzed to determine at least one indicator of a relation between the brand and a person associated with the media object. For example, in an embodiment, person-brand relation determiner 2204 in FIG. 22 may be configured to perform step 2104. As shown in FIG. 22, person-brand relation determiner 2204 receives media object 116, detected person identifiers 716, and detected brand identifiers 2208. Person-brand relation determiner 2204 is configured to analyze media object 116 to determine relations between the detected persons indicated in detected person identifiers 716 and the detected brands in detected brand identifiers 2208. The determined relations may be subsequently used to determine relationships between the brands and persons.

In embodiments, similar to brand representation detector 2202, person-brand relation determiner 2204 may use image analysis techniques, video analysis techniques, and/or audio analysis techniques to determine indicators of relations between the identified persons. For instance, person-brand relation determiner 2204 may include image/video analyzer 1002 and audio analyzer 1004 shown in FIG. 10. Image/video analyzer 1002 is configured to analyze images, including analyzing images to determine indications of relations between brands and persons in the images. In an embodiment, image/video analyzer 1002 may be configured to analyze a stream of images captured sequentially as video to determine indications of relations between brands and persons captured in the video stream. Audio analyzer 1004 may be configured to analyze recordings, which may or may not be accompanied by image and/or video, to determine indications of relations between brands and persons captured in audio form.

Figure 24:
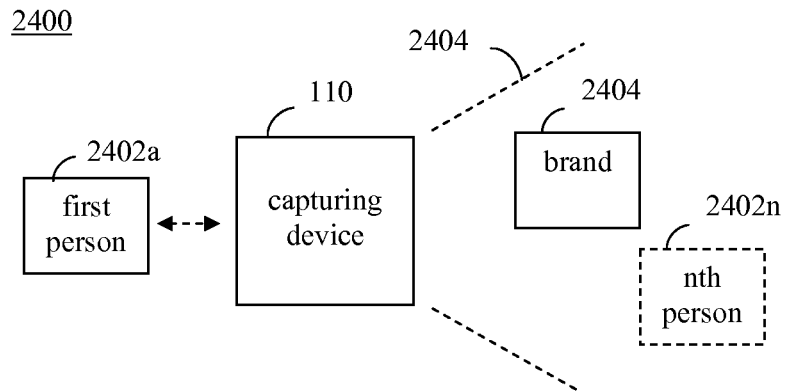
FIGS. 24 and 25 illustrate first and second configurations for capturing media objects, according to example embodiments of the present invention.

In embodiments, person-brand relation determiner 2204 may be configured to determine indications of relations between variously situated brands and persons associated with media object 116. For instance, FIG. 24 illustrates a first configuration 2400 for capturing a media object, according to an example embodiment. As shown in FIG. 11, configuration 2400 includes a capturing device 110, a first person 2402a, a brand 2404, and optionally further persons (e.g., an nth person 2402n). In configuration 2400, first person 2402a operates capturing device 110. Brand 2404 is in a field of capture 2404 of capturing device 110 (as is nth person 2402n), while first person 2402a is not in the field of capture 2404 of capturing device 110. In first configuration 2400, person-brand relation determiner 2204 may be configured to determine indications of relations between brand 2404 first person 2402a by analysis of a media object generated by capturing device 110, even though first person 2402a is not captured in the media object.

Figure 25:
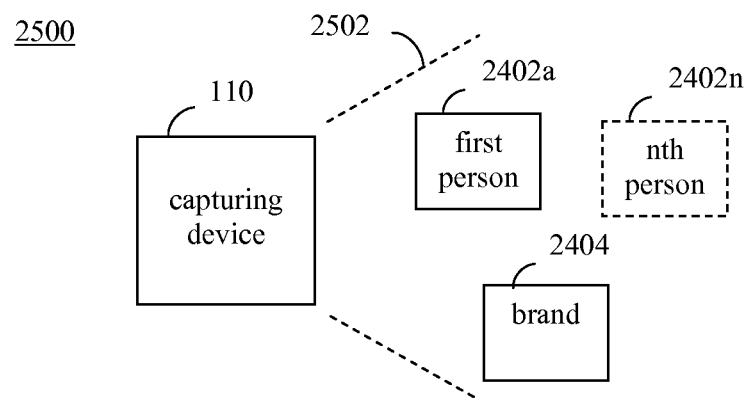

FIG. 25 illustrates a second configuration 2500 for capturing a media object, according to another example embodiment. As shown in FIG. 25, configuration 2500 includes capturing device 110, first person 2402a, brand 2404, and optionally further persons (e.g., nth person 2402n). In configuration 2500, first person 2402a and brand 2404 are both in a field of capture 2502 of capturing device 110 (as is nth person 2402n). In second configuration 2500, person-brand relation determiner 2204 may be configured to determine indications of relations between first person 2402a and brand 2404 that are captured in the media object.

Person-brand relation determiner 2204 is configured to analyze media object 116 for "relation indicators" which may be used to determine a relationship between brands and persons associated with media object 116. Example relation indicators are described below. Person-brand relation determiner 2204 may be configured to determine any number of indications of relations between brands and persons associated with media object 116.

For instance, in an embodiment, media object 116 may be an image. Referring to first configuration 2400 shown in FIG. 24, an image of brand 2404 may be captured in the image, while an image of first person 2402a is not captured in the image. First person 2402a may be operating capturing device 110, for example. In such an embodiment, person-brand relation determiner 2204 may perform step 2602 shown in FIG. 26 to determine one or more relation indicators. In step 2602, the image is analyzed to determine at least one of a distance between the brand and an image capturing device used by the person to capture the image, a proportion of the brand visible in the image, a total number of persons in the image, or a total number of brands in the image. In embodiments, person-brand relation determiner 2204 may determine any one or more of the relation indicators listed in step 2602, and/or further relation indicators, by analysis of an image (or video). The relation indicators recited in step 2602 are described as follows.

For instance, a distance between brand 2404 and capturing device 110 determinable by analysis of the image may be a relation indicator which may indicate a closeness of a relation between brand 2404 and first person 2402a. A greater distance may indicate a more distant (or non-existent) relation, while a lesser distance may indicate a closer relation. For example, referring to FIG. 23, because branded beverage can 2302 (held by person 904) is close to the capturing device that captured image 2300, the brand associated with branded beverage can 2302 may be considered to have a very close relation with the image capturing device operator. Because brand logo 2306 is moderately close to the capturing device that captured image 2300, the brand associated with brand logo 2306 may be considered to have a medium closeness of relation with the operator of the capturing device. Because branded item 2304 is not close to (relatively far from) the capturing device that captured image 2300, the brand associated with branded item 2304 may be considered to have a more distant relation with the operator of the capturing device. Thus, an "out-of-image distance" relation indicator between the brand of branded beverage can 2302 and the device operator may be "close," between the brand of brand logo 2306 and the device operator may be "medium," and between the brand of branded item 2304 and the device operator may be "distant." Additionally or alternatively, an out-of-image distance relation indicator may be provided as an actual determined distance value (e.g., in terms of inches, feet, or meters).

Referring to FIG. 24, a proportion of a brand 2404 visible in the image may indicate a closeness of a relation between brand 2404 and first person 2402a. A full view of brand 2404 may indicate a medium to close relation. A partial view of brand 2404 may indicate a more distant relation. For example, referring to FIG. 23, because branded beverage can 2302 and brand logo 2306 are substantially viewable in full in image 2300, the brands associated with branded beverage can 2302 and brand logo 2306 may be considered to have a medium to close relation with the operator of the capturing device. Because a portion of branded item 2304 is viewable in image 2300, the brand associated with branded item 2304 may be considered to have more distant relation with the operator of the capturing device. Thus, a "brand proportion" relation indicator for the brands associated with branded beverage can 2302 and brand logo 2306 may be "high," "full," "close," "medium," or other suitable indicator value, and the brand associated with branded item 2304 may be "partial," "distant," or other suitable indicator value.

Referring to FIG. 24, a total number of persons detected in the image may indicate a closeness of a relation between brand 2404 and first person 2402a. Person-brand relation determiner 2204 may be configured to count the number of persons in the image, and to record this information as a "total human population' relation indicator. In the example of FIG. 23, the total human population relation indicator may have a value of 5 persons.

Referring to FIG. 24, a total number of brands detected in the image may indicate a closeness of a relation between brand 2404 and first person 2402a. For example, a single brand detected in the image may indicate a closer relation, while an increasingly higher number of brands detected in the image may indicate an increasingly less close/more distant relation. Person-brand relation determiner 2204 may be configured to count the number of brands in the image, and to record this information as a "total brand population' relation indicator. In the example of FIG. 23, the total brand population relation indicator may have a value of 3 brands (corresponding to branded beverage can 2302, branded item 2304, and brand logo 2306).

In the example of step 2602 (in FIG. 26), media object 116 is an image, and the person was not captured in the image with the brand. In another embodiment, media object 116 may be an image, and the person may be captured in the image along with the brand. Referring to second configuration 2500 shown in FIG. 25, an image of brand 2404 and an image of first person 2402a may be captured in the image captured by capturing device 110. In such an embodiment, person-brand relation determiner 2204 may perform step 2702 shown in FIG. 27 to determine one or more relation indicators. In step 2702, the image is analyzed to determine at least one of a distance between the brand and the person in the image, a facial expression of the person in the image, an amount of contact between the brand and the person in the image, a body expression of the person in the image, an activity of the person in the image, a total number of persons in the image, or a co-presence of brands in the image. In embodiments, person-brand relation determiner 2204 may determine any one or more of the relation indicators listed in step 2702, and/or further relation indicators, by analysis of an image (or video). The relation indicators recited in step 2702 that were not described above with respect to step 2602 are described as follows.

For instance, a distance between brand 2404 and first person 2402a in the image may be a relation indicator which may indicate a closeness of a relation between brand 2404 and first person 2402a. A greater distance may indicate a more distant (or non-existent) relation, while a lesser distance may indicate a closer relation. For example, referring to FIG. 23, because branded beverage can 2302 is close to person 904, the brand of branded beverage can 2302 and person 904 may be considered to have a very close relation. Because branded beverage can 2302 is moderately distant from persons 906, 908, and 910, the brand of branded beverage can 2302 may be considered to have a medium closeness of relation with persons 906, 908, and 910. Because branded beverage can 2302 is not close to (relatively far from) person 912, the brand of branded beverage can 2302 and person 912 may be considered to have a more distant relation. Thus, an "in-image distance" relation indicator between the brand of branded beverage can 2302 and person 904 may be "close," between the brand of branded beverage can 2302 and each of persons 906, 908, and 910 may be "medium," and between the brand of branded beverage can 2302 and person 912 may be "distant." Additionally or alternatively, an in-image distance relation indicator may be provided as an actual determined distance value (e.g., in terms of inches, feet, or meters).

Referring to FIG. 25, a facial expression of first person 2402a in the image may indicate a closeness of a relation between brand 2404 and first person 2402a. A frown, an expression of anger, disgust, or other negative facial expression may indicate a more distant or hostile relation. A passive facial expression (e.g., a blank face) may indicate little or no relation. A smile, an expression of pleasure, affection, or other positive facial expression may indicate a closer relation. For example, referring to FIG. 9, because person 904 has a smiling facial expression, the brand of branded beverage can 2302 may be considered to have a close relation with person 904. Because person 906 has a frowning facial expression, the brand of branded beverage can 2302 may be considered to have a more distant relation with person 906. Thus, a "facial expression" relation indicator for the brand of branded beverage can 2302 to person 904 may be "smiling," "positive," or other suitable indicator value, and for the brand of branded beverage can 2302 to person 906 may be "frowning," "negative," or other suitable indicator value.

An amount of contact between brand 2404 and first person 2402a in the image may be a relation indicator which may indicate a closeness of a relation between brand 2404 and first person 2402a. A separation between them (no contact) may indicate a more distant (or non-existent) relation, some contact between them may indicate a medium to close relation, while a large amount of contact may indicate a closer relation. For example, referring to FIG. 23, branded beverage can 2302 and person 904 have a large amount of contact (person 904 is holding branded beverage can 2302), and thus the brand of branded beverage can 2302 and person 904 may be considered to have a close relation with each other. Person 908 is wearing a shirt having brand logo 2306 imprinted thereon, and thus the brand of brand logo 2306 and person 908 may be considered to have a close relation. Person 910 (holding hands with person 908) is in indirect contact with brand logo 2306, and thus the brand of brand logo 2306 and person 910 may be considered to have a medium relation. Person 912 is not in contact with branded beverage can 2302 or brand logo 2306, and thus the brands of branded beverage can 2302 and brand log 2306 may be considered to have distant or no relation with person 912. Thus, a "contact amount" relation indicator between the brand of branded beverage can 2302 and between the brand of brand logo 2306 and person 908 may be "close," or "in contact," between the brand of brand logo 2306 and person 910 may be "medium" or "indirect," and between the brand of branded beverage can 2302 and person 912 (and between the brand of brand logo 2306 and person 912) may be "distant" or no contact."

Referring to FIG. 25, a body expression of first person 2402*a* in the image may indicate a closeness of a relation between first person 2402*a* and brand 2404. A closed posture, a negative (e.g., obscene) gesture, an arms folded posture, a facing away posture, or other negative body expression may indicate a more distant or hostile relation. A neutral posture may indicate little or no relation. An open posture, a waving motion, or other positive body expression may indicate a closer relation. Furthermore, whether first person 2402*a* is facing toward (positive indicator) or away from (negative indicator) brand 2404 may be taken into account. For example, referring to FIG. 23, because each of persons 904, 908, 910, and 912 have open body expressions, persons 904, 908, 910, and 912 may be considered to have close relations with the brands associated with branded beverage can 2302, brand logo 2306, and branded item 2304. Because person 906 has a turning-away body posture, person 906 may be considered to have a more distant relation with the brands associated with branded beverage can 2302, brand logo 2306, and branded item 2304. Thus, a "body expression" relation indicator for each of persons 904, 908, 910, and 912 may be "open," "positive," or other suitable indicator value, and for person 906 may be "closed," "turning-away," "negative," or other suitable indicator value.

Referring to FIG. 25, an activity of first person 2402*a* in the image may indicate a closeness of a relation between first person 2402*a* and brand 2404. Person-brand relation determiner 2204 may be configured to determine an activity (e.g., a sport, work, a chore, shopping, cooking, etc.) undertaken by first person 2402*a* in the image, and to record this information as an "activity indicator."

Note that these examples described above with respect to images may also apply to video. Furthermore, because a stream of images may be analyzed when media object 116 is a video file, a larger amount of relation information may be obtained (e.g., by analyzing each image in the video stream separately, and by correlating the images in the video stream).

The examples of steps 2602 (in FIG. 26) and step 2702 (in FIG. 27) relate to images. As described above, in another embodiment, media object 116 may be audio, and the second person may or may not be captured in the audio. For instance, referring to second configuration 2500 shown in FIG. 25, audio (e.g., voice) related to brand 2404 and audio related to first person 2402*a* may be present in the audio recording captured by capturing device 110. In such an embodiment, person-brand relation determiner 2204 may perform step 2802 shown in FIG. 28 to determine one or more relation indicators from the captured audio. In step 2802, the audio object is analyzed to determine an attitude of the person or an activity of the person related to the brand. In embodiments, person-brand relation determiner 2204 may determine any one or more of the relation indicators listed in step 2802, and/or further relation indicators, by analysis of an audio recording. The relation indicators recited in step 2802 are described as follows.

Referring to FIG. 25, an attitude of first person 2402*a* may be determined by person-brand relation determiner 2204 by analyzing the audio captured in the recording. For instance, a content of any speech, a tone of speech, a relative volume, and/or further audio characteristics of the speech/voice of first person 2402*a* may indicate a closeness of a relation between brand 2404 and first person 2402*a*. Speech indicating negative feelings such as anger, frustration, contempt, etc., may be determined from analyzing the audio recording, and may indicate a more distant or hostile relation. Relatively passive or neutral speech may indicate little or no relation. Speech indicating positive feelings such as pleasure, affection, etc. may indicate a closer relation. An "attitude" relation indicator for each person may have indicator values such as "negative," "angry," "frustrated," "hostile," "happy," "affectionate," "positive," "neutral," "passive," or other suitable indicator value.

An activity of first person 2402*a* may be determined by person-brand relation determiner 2204 by analyzing the audio captured in the recording. For instance, analysis of the recorded audio may determine a sport, a type of work, a type of chore, or other activity in which first person 2402*a* may be involved. An activity relation indicator generated for each person may have indicator values identifying a corresponding determined activity.

Referring back to FIG. 22, person-brand relation determiner 2204 generates brand-person relation indicators 2210, which includes one or more relation indicators determined by person-brand relation determiner 2204.

Referring back to FIG. 21, in step 2106, a relationship between the brand and the person is predicted based at least on the determined at least one relation indicator. For example, in an embodiment, person-brand relationship predictor 2206 shown in FIG. 22 may be configured to perform step 2106. Person-brand relationship predictor 2206 receives brand-person relation indicators 2210 and optionally receives metadata 712. Person-brand relationship predictor 2206 is configured to determine relationships between one or more brands and one or more persons having representations captured in media object 116 based on brand-person relation indicators 2210. As shown in FIG. 22, person-brand relationship predictor 2206 generates brand-person relationship predictions 2212, which includes relationship predictions for one or more pairs of brands and persons detected in media object 116.

For example, in an embodiment, person-brand relationship predictor 2206 may predict a relationship between each brand-person pair in media object 116 based on the relation indicators determined by person-brand relation determiner 2204 that involve the pair. For example, referring to image 2300 shown in FIG. 23, persons 904, 906, 908, 910, and 912 and the image capturing device operator are present, for a total of six persons. Furthermore, branded beverage can 2302, branded item 2304, and brand logo 2306 are present, for a total of three brands. Each of the six persons may have a relationship with the three brands shown in image 2300, for a total of 18 relationships present between the six persons and the three brands. Person-brand relationship predictor 2206 may be configured to predict each of the 18 relationships based on the corresponding relation indicators.

For example, in FIG. 23, with respect to the brand associated with branded beverage can 2302 and the person operating the image capturing device, brand-person relation indicators 2210 may include the following relation indicators (or equivalent values) based on analysis of media object 116:

out-of-image distance="close"
    proportion of brand visible in image 2300="high"
    number of persons detected in image 2300=5
    number of brands detected in image 2300=3

Based on these relation indicators for person 904 and the device operator, person-brand relationship predictor 2206 may predict that the brand of branded beverage can 2302 and the device operator have a "close" relationship. Person-brand relationship predictor 2206 may take into account further demographic information, such as age and sex that may be ascertainable from image 2300 or from metadata 712. Age and/or sex information may be used to further imply relationships between persons and brands that are directed at particular age groups (e.g., SpongeBob SquarePants directed to children) and/or a particular sex (e.g., cosmetic brands directed to women). Furthermore, person-brand relationship predictor 2206 may take into account relationships predicted (or known from metadata 712) regarding the other persons in image 2300 and/or other brands in predicting the relationship between brands and persons. For example, if person 904 is predicted (with relatively high probability) to be a "partner," "husband," "wife," or "girlfriend," with the device operator, and is predicted to have a close relationship with the brand of branded beverage can 2302, this may increase the probability of a close relationship between the brand of branded beverage can 2302 and the device operator.

In another example, with respect to the brand of branded beverage can 2302 and person 906, brand-person relation indicators 2210 may include the following relation indicators (or equivalent values) based on analysis of media object 116:

in-image distance between the brand and person 906="medium"
    facial expression of person 906="frowning"
    amount of contact="none"
    body portion of person 906="partial body"
    number of persons present=5
    number of brands present=3

Based on these relation indicators for the brand of branded beverage can 2302 and person 906, person-brand relationship predictor 2206 may predict that the brand of branded beverage can 2302 and person 906 do not have a close relationship, and that person 906 may actually dislike the brand of branded beverage can 2302. As described above, person-brand relationship predictor 2206 may take into account further demographic information, such as age and sex that may be ascertainable from image 2300 or from metadata 712, and may have a bearing on the relationship.

Thus, different types of relationships may be predicted for brand-person pairs based on various combinations of values for relation indicators, modified according to age, sex, and/or further demographics. Examples relationships which may be predicted are listed below in Table 2, along with some example values for some relation indicators which may be used to predict the relationships between brand-person pairs:

TABLE 2

| relationship | example relation indicator values | Further relation indicator factors |
| --- | --- | --- |
| close (high level of interest) | out-of-image distance = "close" to "medium"<br>in-image distance = "close" to "medium"<br>amount of contact = "high"<br>facial expression = "smiling"<br>body expression = "open"<br>brand proportion = "high," "full," "central"<br>activity = person engaged in activity related to brand<br>total person population = low value<br>total brand population = low value | brand is directed to age group and/or sex of the person |
| medium (medium level of interest) | out-of-image distance = "medium"<br>in-image distance = "medium"<br>amount of contact = "medium"<br>facial expression = "smiling" to "passive"<br>body expression = "open"<br>brand proportion = "medium"<br>total person population = medium value<br>total brand population = medium value | brand is directed to age group or sex of the person, but not both |
| low (low level of interest) | out-of-image distance = "far"<br>in-image distance = "far"<br>amount of contact = "low"<br>facial expression = "passive"<br>body expression = "uncommitted"<br>brand proportion = "low" or "partial"<br>activity = person not engaged in activity related to brand<br>total person population = high value<br>total brand population = high value | brand is not directed to age group or sex of the person |
| dislike | out-of-image distance = "far"<br>in-image distance = "far"<br>amount of contact = "low"<br>facial expression = "angry," "contempt," "disgust"<br>body expression = "closed"<br>brand proportion = "low" or "partial"<br>activity = person not engaged in activity related to brand<br>total person population = high value<br>total brand population = high value | brand is directed to age group or sex different from those of the person |

Note that that further types of relationships between brands and persons may be predicted by person-brand relationship predictor 2206 than those shown in Table 2. Furthermore, further relation indicators, and alternative values of the relation indicators, than those shown in Table 2 may be used by person-brand relationship predictor 2206 to predict relationships.

In an embodiment, brand-person relation indicators 2210 may be provided to person-brand relationship predictor 2206 in the form of textual expressions (as shown in the above example of Table 2). In such an embodiment, person-brand relationship predictor 2206 may process brand-person relation indicators 2210 using natural language processing techniques, or may convert the textual expressions into numerical form reflective of the relations indicators for processing. Alternatively, brand-person relation indicators 2210 may be provided to person-brand relationship predictor 2206 in numerical form, and person-brand relationship predictor 2206 may process brand-person relation indicators 2210 in their numerical form. In an embodiment, person-brand relationship predictor 2206 may process relation indicators according to an expression. For instance, each relation indicator may be weighted, some related relation indicators may be combined, and the weighted and/or combined relation indicators may be summed to generate a relationship prediction for a brand-person pair. In further embodiments, person-brand relationship predictor 2206 may process brand-person relation indicators 2210 in alternative ways to predict relationships.

Figures 29, 30:
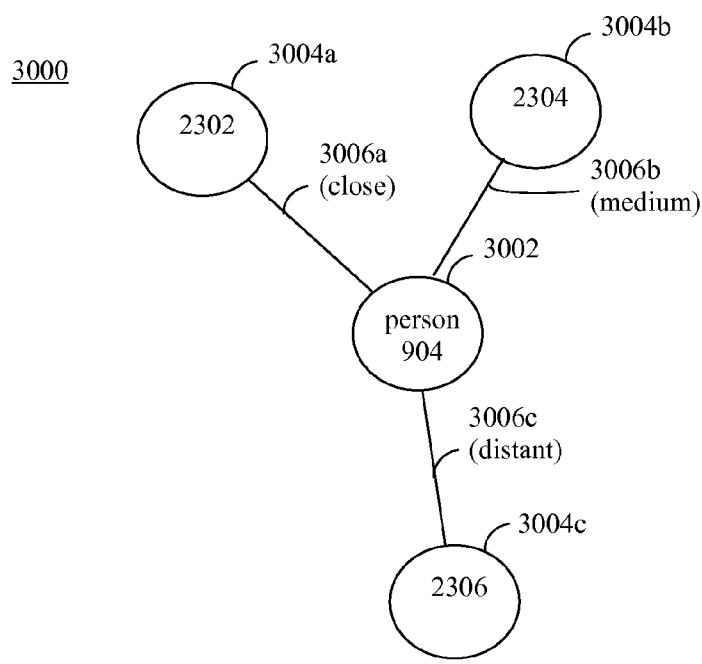
FIG. 29 shows a process for generating a social relations graph, according to example embodiments of the present invention.
FIG. 30 shows a portion of a social relations graph, according to an example embodiment of the present invention.

After person-brand relationship predictor 2206 has predicted relationships between each brand-person pair in media object 116, person-brand relationship predictor 2206 may optionally generate a social relation graph that indicates the predicated relationships for media object 116. For example, person-brand relationship predictor 2206 may include a social relation graph generator, or may access social relation graph generator 1602 shown in FIG. 16. In an embodiment, the social relation graph generator may be configured to perform step 2902 shown in FIG. 29. In step 2902, a social relations graph is generated based on the predicted relationships, and that includes a node corresponding to each brand and to each person captured in the media object. For example, a social relation graph generator may receive brand-person relationship predictions 2212, and may generate a social relations graph. For instance, FIG. 30 shows a portion of a social relations graph 3000 that may be generated, according to an embodiment. Social relations graph 3000 is a portion of an example social relations graph that may be generated with regard to image 2300 shown in FIG. 23. As shown in FIG. 30, social relations graph 3000 includes four nodes, including a person node 3002 corresponding to person 904 and three brand nodes 3004a-3004c corresponding to branded beverage can 2302, brand logo 2304, and branded item 2306 of image 2300. Furthermore, social relations graph 3000 includes three relationship links 3006a-3006e which indicate relationships between the person node 3002 and each of brand nodes 3004a-3004c. Nodes for persons 906, 908, 910, and 912, and relationship links between the nodes for persons 906, 908, 910, and 912 and brand nodes 3004a-3004c may also be present in social relations graph 3000, but are not shown in FIG. 30 for ease of illustration.

In the example of FIG. 30, first relationship link 3006a indicates a close relationship between person 904 (node 3002) and the brand of branded beverage can 2302 (node 3004a). Second relationship link 3006b indicates a medium relationship between person 904 (node 3002) and the brand of brand logo 2304 (node 3004b). Third relationship link 3006c indicates a distant relationship between person 904 (node 3002) and the brand of branded item 2306 (node 3004c). The relationships shown in FIG. 30 are provided for purposes of illustration and are not intended to be limiting. Although shown for illustrative purposes in graphical form in FIG. 30, social relations graph 3000 may be represented in numerical and/or any other suitable form.

Note that person-brand relationship predictor 2206 may use additional information to predict brand-person relationships for media object 116. For example, an identification of a location in which media object 116 was captured may be used to further enable predictions of relationships. For instance, a person who captured media object 116 may add location information to media object 116 as a tag or in other manner, and the location information may be included in metadata 712. Alternatively, image recognition techniques (e.g., image recognition module 806 in FIG. 8 or image recognition module 1006 in FIG. 10) or audio analysis techniques (e.g., audio analyzer 804 in FIG. 8 or audio analyzer 1004 in FIG. 10) may be used to process media object 116 to determine the location. By processing location information (e.g., a workplace, a store, a travel destination, an event location, etc.), relationship predictions can be made even more accurately.

Furthermore, an identification of a time at which media object 116 was captured may be used to further enable prediction of relationships. For instance, a person who captured media object 116 may add time information to media object 116 as a tag or in other manner, or the time information may be added automatically by the media capturing device, and the time information may be included in metadata 712. By processing time information (e.g., morning, afternoon, evening, weekend, weekday, work hours, rush hour, etc.), relationship predictions can be made even more accurately.

Referring back to FIG. 21, in step 2108, data representative of the predicted relationship is associated with the media object. Step 2108 is optional. In an embodiment, media object packager 710 shown in FIG. 22 may be configured to perform step 2108. As shown in FIG. 22, media object packager 710 receives media object 116, predicted relationships 720 (for person pairs), and brand-person relationship predictions 2212. Media object packager 710 may be configured to package together media object 116, (person-person) predicted relationships 720 (when present), and brand-person relationship predictions 2212 to form processed media object 118. For example, in an embodiment, predicted relationships 720 and/or brand-person relationship predictions 2212 may be associated with media object 118 as metadata, or in any other manner, as would be known to persons skilled in the relevant art(s).

Brand representation detector 2202, person-brand relation determiner 2204, and person-brand relationship predictor 2206 shown in FIG. 22, flowchart 2100 of FIG. 21, step 2602 of FIG. 26, step 2702 of FIG. 27, step 2802 of FIG. 28, and/or step 2902 of FIG. 29 may be implemented in hardware, software, firmware, or any combination thereof, including being implemented as computer code configured to be executed in one or more processors and/or as hardware logic/electrical circuitry.

Figure 31:
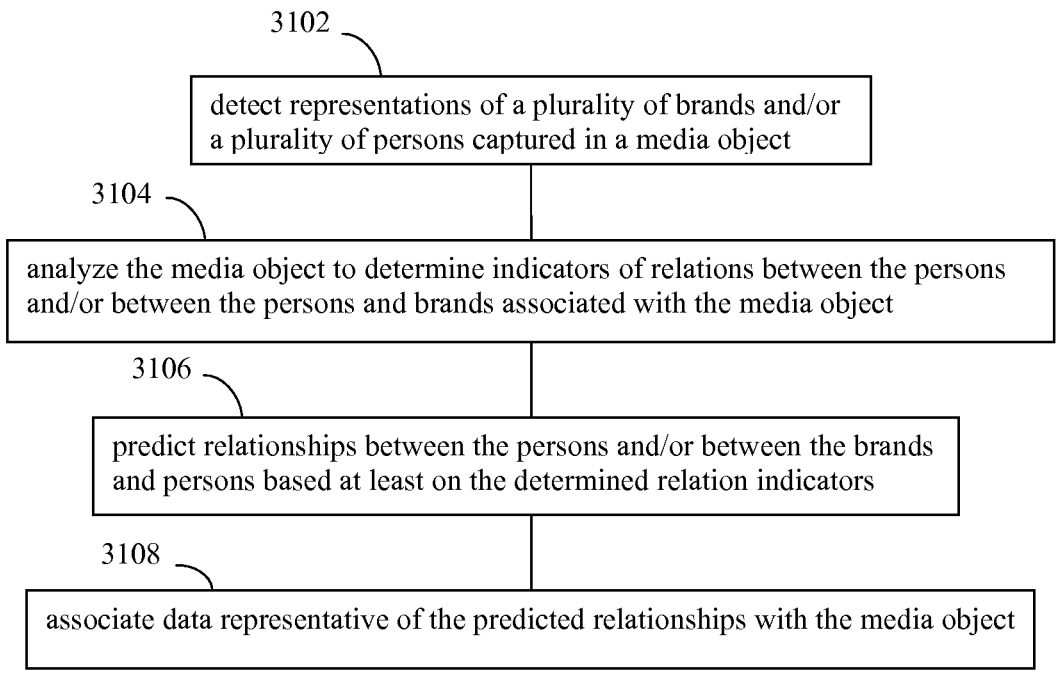
FIG. 31 shows a flowchart for processing a media object, according to an example embodiment of the present invention.

D. Example Embodiments For Predicting Relationships Between Persons and Between Brands and Persons Note that in embodiments, relationships may be predicted between persons, between persons and brands, and both between persons and between persons and brands for media objects. Furthermore, such relationships may be predicted for any number of persons and/or brands in a media object. For example, FIG. 31 shows a flowchart 3100 for processing a media object, according to an example embodiment of the present invention. Flowchart 3100 may be performed by media object metadata engine 104, for example. Further structural and operational embodiments will be apparent to persons skilled in the relevant art(s) based on the discussion regarding flowchart 3100. Flowchart 3100 is described as follows.

Flowchart 3100 begins with step 3102. In step 3102, representations of a plurality of brands and/or a plurality of persons captured in a media object are detected. For example, referring to FIG. 7, human representation detector 704 may be present to detect representations of persons in media object 116. Referring to FIG. 22, brand representation detector 2202 may be present to detect representations of brands in media object 116. Either or both of human representation detector 704 and brand representation detector 2202 may be present in embodiments, depending on whether persons, brands, or both persons and brands are to be detected.

In step 3104, the media object is analyzed to determine indicators of relations between the persons and/or between the persons and brands associated with the media object. For example, referring to FIG. 7, relation determiner 706 may be present to relations between persons in media object 116. Referring to FIG. 22, person-brand relation determiner 2204 may be present to determine relations between brands and persons in media object 116. Either or both of relation determiner 706 and person-brand relation determiner 2204 may be present in embodiments, depending on whether relation indicators for persons and/or for persons and brands are to be determined.

In step 3106, relationships between the persons and/or between the brands and persons are predicted based at least on the determined relation indicators. For example, referring to FIG. 7, relationship predictor 708 may be present to predict relationships between persons in media object 116. Referring to FIG. 22, person-brand relationship predictor 2206 may be present to predict relationships between brands and persons in media object 116. Either or both of relationship predictor 708 and person-brand relationship predictor 2206 may be present in embodiments, depending on whether relationships between persons and/or between persons and brands are to be predicted.

In step 3108, data representative of the predicted relationships is associated with the media object. For example, referring to FIG. 22, media object packager 710 may be present to associate data representative of the predicted relationships with media object 116 to generate processed media object 118. Either or both of predicted person-person relationships and/or person-brands relationships may be associated with a media object in embodiments, depending on whether relationships between persons and/or between persons and brands are predicted.

E. Example User Information

Figure 32:
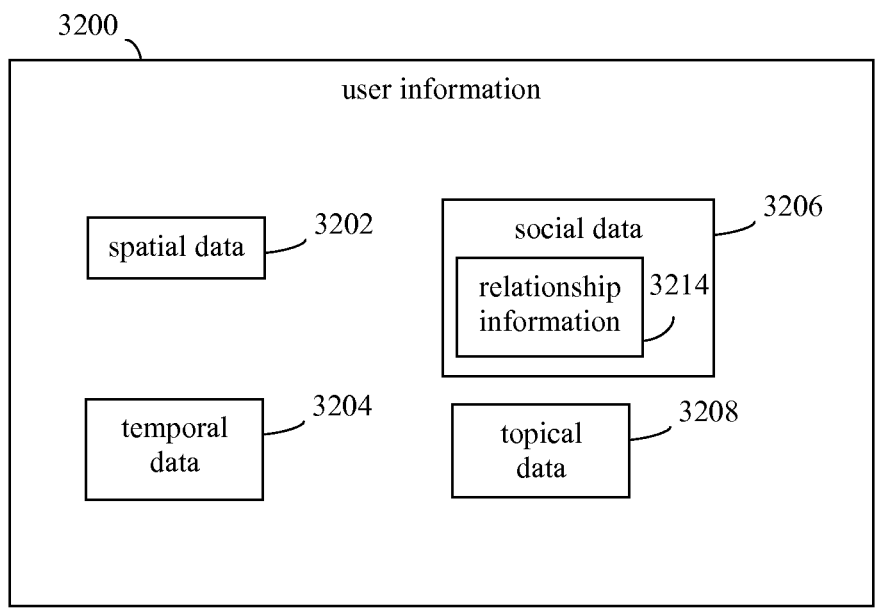
FIG. 32 shows a block diagram of user information, according to an example embodiment of the present invention.

As described above, user information for one or more persons detected in a media object may be used to determine identities of persons and/or to predict relationships. The user information for each person may be actively provided by the person, collected from user devices through communication network 102 (FIG. 1) and/or another channel, provided from some other network, system or database that aggregates such data, or by any combination of the foregoing. For example, FIG. 32 shows a block diagram of user information 3200, which is an example of user information for a user/person, according to an embodiment of the present invention. User information 3200 shown in FIG. 32 may be included in a file or other data structure. Each element of user information 3200 shown in FIG. 32 may be one or more data fields, data records, or other type of data entry in a data structure.

As shown in FIG. 32, user information 3200 includes spatial data 3202, temporal data 3204, social data 3206 and topical data 3208. Each of the elements of user information 3200 shown in FIG. 32 is not necessarily present in all embodiments. The elements of user information 3200 shown in FIG. 32 are described as follows.

Spatial data 3202 may be any information associated with a location of a user and/or an electronic device associated with the user. For example, spatial data 3202 may include any passively-collected location data, such as cell tower data, GPRS data, global positioning service (GPS) data, WI-FI data, personal area network data, IP address data and data from other network access points, or actively-collected location data, such as location data entered into a device by a user. Spatial data 3202 may be obtained by tracking the path and state of an electronic device (e.g., a user device 502 in FIG. 5) associated with the user.

Temporal data 3204 is time-based data (e.g., time stamps) or metadata (e.g., expiration dates) that relates to specific times and/or events associated with a user and/or an electronic device associated with the user. For example, temporal data 3204 may include passively-collected time data (e.g., time data from a clock resident on an electronic device, or time data from a network clock), or actively-collected time data, such as time data entered by the user of the electronic device (e.g., a user-maintained calendar).

Social data 3206 may be any data or metadata relating to the relationships of a user of an electronic device. For example, social data 3206 may include user identity data, such as gender, age, race, name, an alias, a status of the user (e.g., an online status or a non-online related status) (e.g., at work, at sleep, on vacation, etc.), a social security number, image information (such as a filename for a picture, avatar, or other image representative of the user), and/or other information associated with the user's identity. User identity information may also include e-mail addresses, login names and passwords. Social data 3206 may also include social network data. Social network data may include data relating to any relation of the user of the electronic device that is input by a user, such as data relating to a user's friends, family, co-workers, business relations, and the like. Social network data may include, for example, data corresponding with a user-maintained electronic address book. Certain social data may be correlated with, for example, location information to deduce social network data, such as primary relationships (e.g., user-spouse, user-children and user-parent relationships) or other relationships (e.g., user-friends, user-co-worker, user-business associate relationships) and may be weighted by primacy.

For example, as shown in FIG. 32, social data 3206 may include relationship information 3214. Relationship information 3214 includes a list or other data structure indicating friends of the user, including friends that are other users 108 participating in a social network. Relationship information 3214 may include categories for the indicated friends, such as "relatives," "spouse," "parents," "children," "cousins," "best friends," "boss," "co-workers," and/or any other suitable category.

Social data 3206 may further include reputation information regarding the user within the confines of a social network. For example, other users in a social network may be able to comment on and/or provide a rating for the user. An overall rating may be determined for the user, which may represent a reputation for the user in the social network.

Topical data 3208 may be any data or metadata concerning subject matter in which a user of an electronic device appears to have an interest or is otherwise associated. Topical data 3208 may be actively provided by a user or may be derived from other sources. For example, topical data 3208 may include one or more transaction log(s) 3204 of transactions involving the user. For example, transaction log(s) 3204 may include logs of searches (e.g., query lists/results lists) performed by the user, logs of commerce undertaken by the user, logs of website/webpage browsing by the user, logs of communications by the user, etc.

Both social data 3206 and topical data 3208 may be derived from interaction data. As used herein, the term interaction data refers to any data associated with interactions carried out by a user via an electronic device, whether active or passive. Examples of interaction data include interpersonal communication data, media data, transaction data and device interaction data.

Interpersonal communication data may be any data or metadata that is received from or sent by an electronic device and that is intended as a communication to or from the user. For example, interpersonal communication data may include any data associated with an incoming or outgoing SMS message, e-mail message, voice call (e.g., a cell phone call, a voice over IP call), or other type of interpersonal communication relative to an electronic device, such as information regarding who is sending and receiving the interpersonal communication(s). As described below, interpersonal communication data may be correlated with, for example, temporal data to deduce information regarding frequency of communications, including concentrated communication patterns, which may indicate user activity information.

Media data may be any data or metadata relating to presentable media, such as audio data, visual data and audiovisual data. Audio data may be, for example, data relating to downloaded music, such as genre, artist, album and the like, and may include data regarding ringtones, ring backs, media purchased, playlists, and media shared, to name a few. Visual data may be data relating to images and/or text received by an electronic device (e.g., via the Internet or other network). Visual data may include data relating to images and/or text sent from and/or captured at an electronic device.

Audiovisual data may include data or metadata associated with any videos captured at, downloaded to, or otherwise associated with an electronic device.

Media data may also include media presented to a user via a network, such as via the Internet, data relating to text entered and/or received by a user using the network (e.g., search terms), and data relating to interaction with the network media, such as click data (e.g., advertisement banner clicks, bookmarks, click patterns and the like). Thus, media data may include data relating to a user's RSS feeds, subscriptions, group memberships, game services, alerts, and the like. Media data may also include non-network activity, such as image capture and/or video capture using an electronic device, such as a mobile phone. Image data may include metadata added by a user, or other data associated with an image, such as, with respect to photos, location at which the photos were taken, direction of the shot, content of the shot, and time of day, to name a few. As described in further detail below, media data may be used for example, to deduce activities information or preferences information, such as cultural and/or buying preferences information.

Interaction data may also include transactional data or metadata. Transactional data may be any data associated with commercial transactions undertaken by a user via an electronic device, such as vendor information, financial institution information (e.g., bank information), financial account information (e.g., credit card information), merchandise information and cost/prices information, and purchase frequency information, to name a few. Transactional data may be utilized, for example, to deduce activities and preferences information. Transactional information may also be used to deduce types of devices and/or services owned by a user and/or in which a user may have an interest.

Interaction data may also include device interaction data and metadata. Device interaction data may be any data relating to a user's interaction with an electronic device not included in any of the above categories, such as data relating to habitual patterns associated with use of an electronic device. Example of device interaction data include data regarding which applications are used on an electronic system/device and how often and when those applications are used. As described in further detail below, device interaction data may be correlated with temporal data to deduce information regarding user activities and patterns associated therewith.

User information 3200 may also include deduced information. The deduced information may be deduced based on one or more of spatial data 3202, temporal data 3204, social data 3206, or topical data 3208 as described above. The deduced information may thus include information relating to deduced locations and/or deduced activities of the user. For example, the deduced information may comprise one or more of a primary user location, secondary user location, past locations, present location, and predicted future location information. The deduced information may include information deduced based on a correlation of spatial data 3202 in conjunction with temporal data 3204 to deduce such location data. By way of illustration, spatial data 3202 may be correlated with temporal data 3204 to determine that a user of an electronic device is often at one or more specific locations during certain hours of the day. In a particular embodiment, spatial data 3202 is correlated with temporal data 3204 to determine a primary user location (e.g., home), a secondary location (e.g., school or work) and/or other locations, as well as a cyclical model for a user's spatial/temporal patterns.

The deduced information may also include activity information, such as past activity information, present activity information, and predicted future activity information. In this regard, the past, present, or predicted future activity information may include information relating to past communications and/or co-locations with other users. By way of example, spatial data 3202 may be correlated with temporal data 3204 to determine a user's activities (e.g., work, recreation and/or home activities).

The deduced information may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user. All preferences may be explicitly provided by a user or implicitly derived from aggregated user and network data.

III. Embodiments For Monetizing Predicted Relationships

In embodiments, the relationships predicted through the analysis of media objects may be leveraged to generate revenue for entities. In an embodiment, a sponsored advertisement matching engine imbeds in media objects personalized marketing to consumers of the media objects. In a further embodiment, a media rights and representation engine and marketplace may be coupled to the advertisement matching engine to enable creator-owner revenue sharing services.

Figure 33:
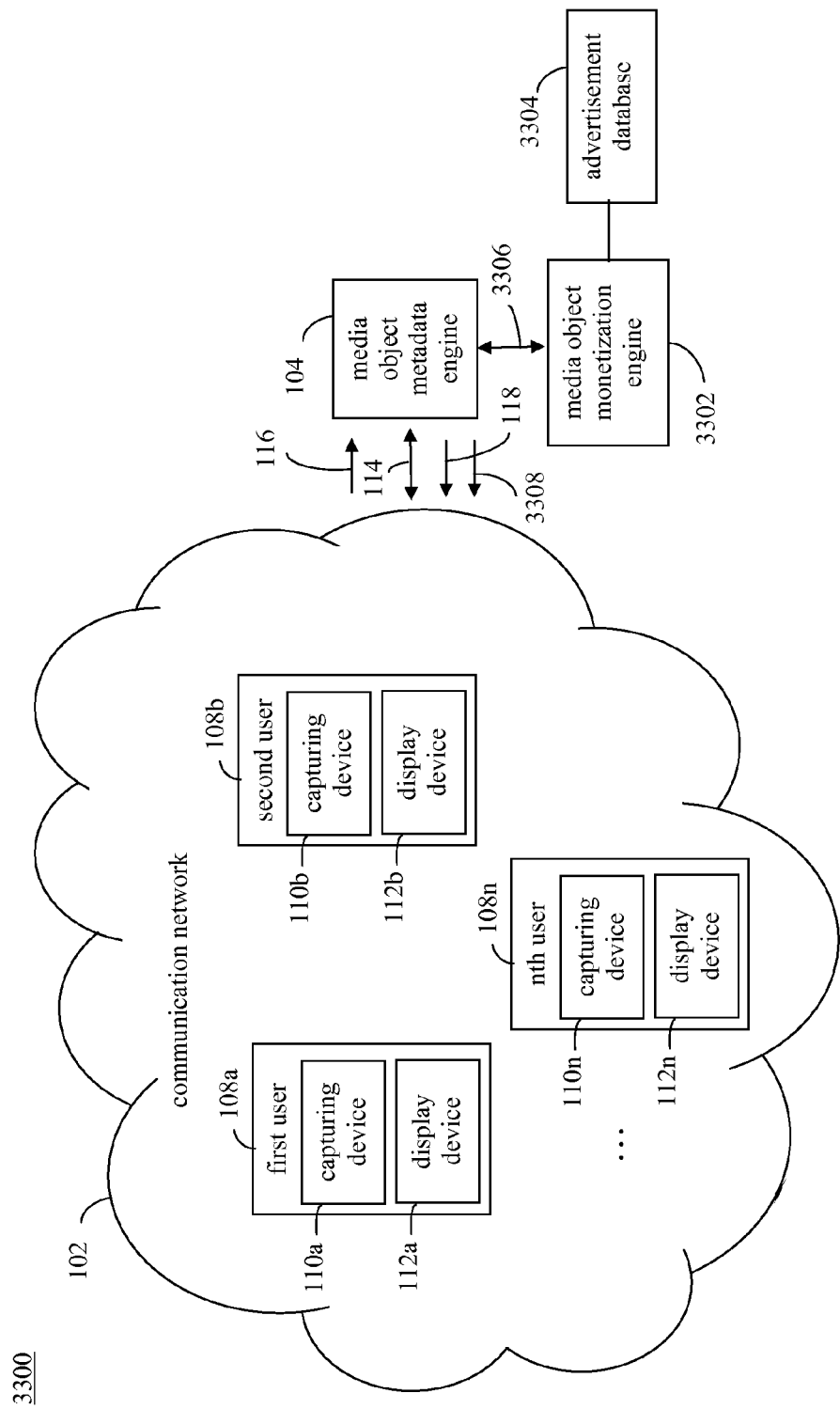
FIG. 33 shows a block diagram of a media object capture, processing, sharing, and monetizing system, according to an example embodiment of the present invention.

For example, FIG. 33 shows a block diagram of a media object capture, processing, sharing, and monetizing system 3300, according to an example embodiment of the present invention. Media object capture, processing, sharing, and monetizing system 3300 is similar to media object capture, processing, and sharing system 100 shown in FIG. 1, with differences described as follows. System 3300 enables users to capture and share media objects, enables the media objects to be processed to determine information regarding their contents, and enables the processed media objects to be monetized. As shown in FIG. 33, system 3300 includes communication network 102, media object metadata engine 104, a media object monetization engine 3302, and an advertisement database. Similar to system 100 shown in FIG. 1, media object metadata engine 104 is communicatively coupled to communication network 102 by communication link 114. Furthermore, media object monetization engine 3302 is coupled to media object metadata engine 104 by a communication link 3306, and is coupled to advertisement database 3304. The elements of system 3300 (that are not already described in detail above) are described in detail below.

As described above, media object metadata engine 104 receives and processes media objects, such as media object 116, to generate relationship information, such as predicted (person-person) relationships 720 (FIG. 7) and brand-person relationship predictions 2212 (FIG. 22). Media object metadata engine 104 may package the relationship information with a media object to generate a processed media object, such as media object 118. Media object monetization engine 3302 may receive the relationship information generated by media object metadata engine 104, and may select one or more advertisements from advertisement database 3304 for display to users, such as the persons detected to be present in a processed media object and/or further persons determined to be socially connected to the detected persons. In an embodiment, the advertisements may be selected based on the predicted relationships between persons and/or between persons and brands. For example, as shown in FIG. 33, media object metadata engine 104 may output a media object 3308, which may include one or more advertisements selected by media object monetization engine 3302. In embodiments, media object monetization engine 3302 may be configured to monetize media objects in further ways.

Media object monetization engine 3302 enables the creation of new real estate for advertising or marketing presentations to users during the creation, processing, distribution, consumption and re-use of content media objects by connecting media objects to a representation of the relationships between the media objects and users and other users and objects/brands.

For example, advertising and/or marketing may be directed persons according to the relationships indicated by social relations graphs generated by social relation graph generator 1602. Whether a person is the media object owner/capturer, a subject/brand/user captured in the media object, a consumer, a media object "tagger," or a re-user of the media object, media object monetization engine 3302 may be configured to match the intersection of the person with the media object with the real-time social relations graph of users, a prioritized list of sponsors, advertisements, and/or marketing incentives.

Figure 34:
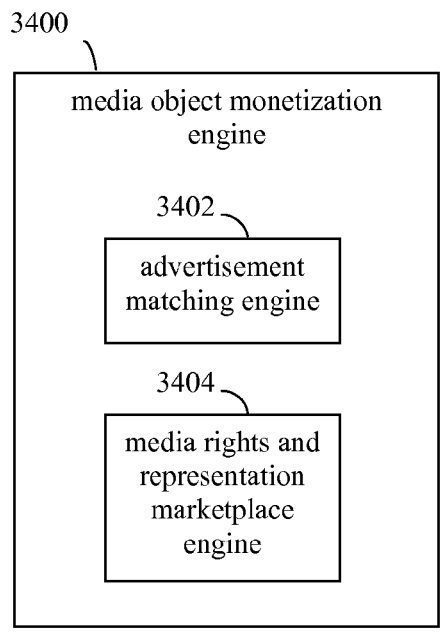
FIG. 34 shows a block diagram of a media object monetization engine, according to an example embodiment of the present invention.

Media object monetization engine 3302 may be configured in various ways. For instance, FIG. 34 shows a block diagram of media object monetization engine 3302, according to an example embodiment. As shown in FIG. 34, media object monetization engine 3302 includes an advertisement matching engine 3402 and a media rights and representation marketplace and engine 3404. Either or both of advertisement matching engine 3402 and media rights and representation marketplace and engine 3404 may be present, in embodiments. Advertisement matching engine 3402 is configured to select advertisements based on relationships predicted by media object metadata engine 104. Media rights and representation marketplace and engine 3404 is configured to enable further marketing regarding media objects. Examples embodiments for advertisement matching engine 3402 and media rights and representation marketplace and engine 3404 are described as follows.

Figure 35:
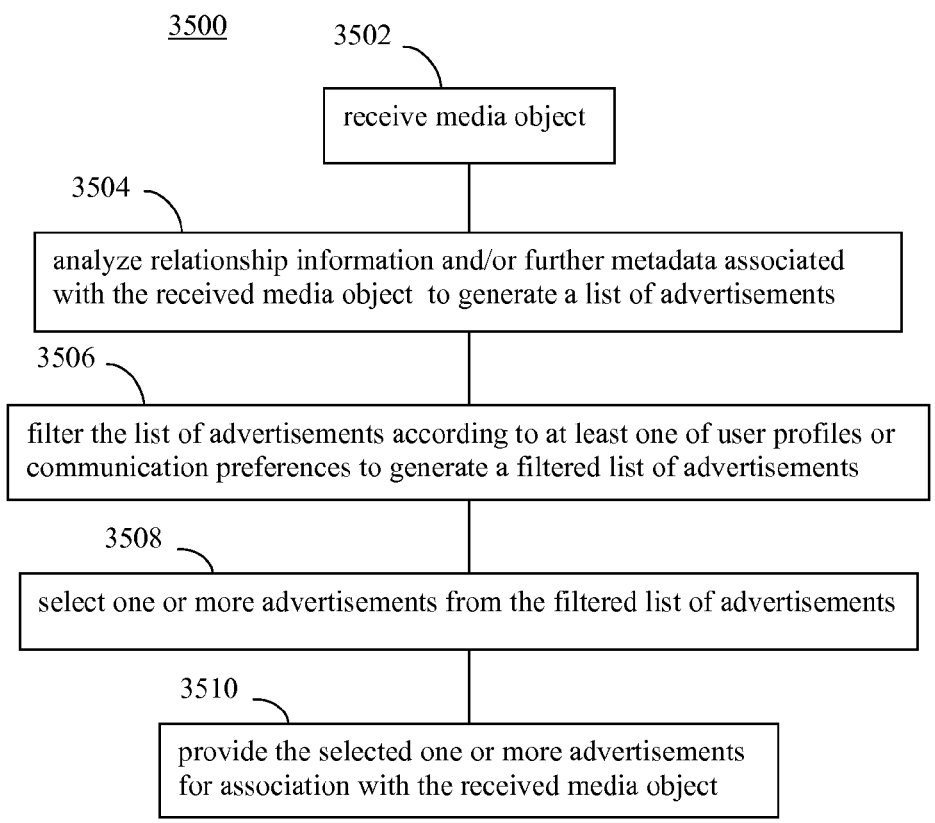
FIG. 35 shows a flowchart for matching advertisements with media objects, according to an example embodiment of the present invention.
Figure 36:
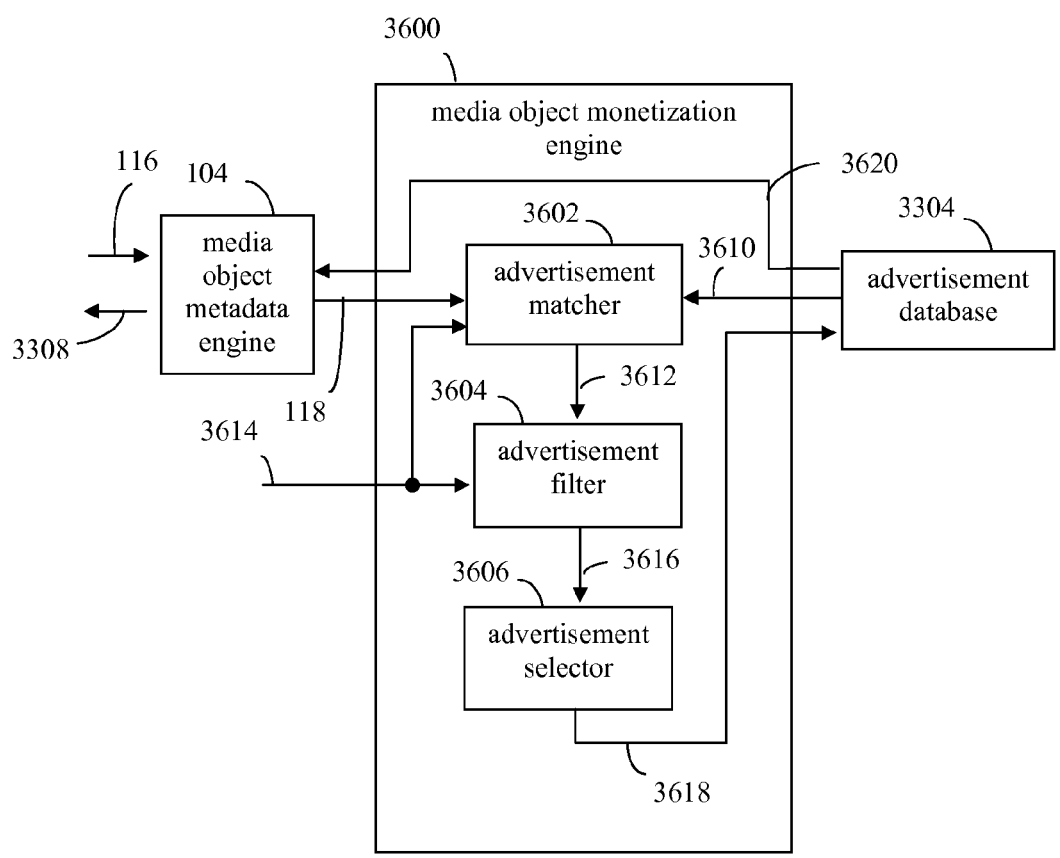
FIG. 36 shows a block diagram of an advertisement matching engine, according to an example embodiment of the present invention.

FIG. 35 shows a flowchart 3500 for matching advertisements with media objects, according to an example embodiment of the present invention. Flowchart 3500 may be performed by advertisement matching engine 3402, for example. For illustrative purposes, flowchart 3500 is described with respect to FIG. 36. FIG. 36 shows a block diagram of an advertisement matching engine 3600, which is an example of advertisement matching engine 3402, according to an embodiment. As shown in FIG. 36, advertisement matching engine 3600 includes an advertisement matcher 3602, an advertisement filter 3604, and an advertisement selector 3606. Further structural and operational embodiments will be apparent to persons skilled in the relevant art(s) based on the discussion regarding flowchart 3500. Flowchart 3500 is described as follows.

Flowchart 3500 begins with step 3502. In step 3502, a media object is received. For example, as shown in FIG. 36, advertisement matcher 3602 receives processed media object 118. As shown in FIG. 36, advertisement matcher 3602 may also receive an advertisement index 3610 from advertisement database 3304, which includes information regarding advertisements available by advertisement database 3304 to be provided to users.

In step 3504, relationship information and/or further metadata associated with the received media object is/are analyzed to generate a list of advertisements. For example, as shown in FIG. 36, advertisement matcher 3602 is configured to analyze relationship information, such as predicted (person-person) relationships 720 of FIG. 7 and/or brand-person relationship predictions 2212 of FIG. 22 received in media object 118, to generate a list of advertisements 3612. Advertisement matcher 3602 may also optionally analyze further metadata (e.g., metadata 714 for FIG. 7) associated with media object 118 to generate list of advertisements 3612. Advertisement matcher 3602 may search advertisement index 3610 using the relationship information and/or metadata to match advertisements indexed therein.

For instance, advertisements that may be included in list of advertisements 3612 may include advertisements for brands having representations detected in media object 118, as described above (e.g., in step 2102 in FIG. 21). Furthermore, advertisements for similar brands to those having representations detected in media object 118, or for competing brands to those having representations detected in media object 118, may be selected for potential inclusion in media object 118.

As shown in FIG. 36, advertisement matcher 3602 may receive user information 3614, which may include user information (e.g., as described above with respect to FIG. 32) regarding one or more persons detected to have representations in media object 118. User information 3614 may be used to determine interests of one or more of the detected persons. One or more advertisements may be selected for list of advertisements 3612 based on the interest information present in user information 3614. Furthermore, the relationship information received in media object 118 can be used to extrapolate the interest information received in user information 3614 for a first person having a representation in media object 118 to a second person having a representation in media object 118, and/or to a third person that does not have a representation in media object 118, but may interact with media object 118.

For example, the first and second (or third) persons may be related in any manner, including father-son, mother-daughter, boyfriend-girlfriend, partners, spouses, etc. By determining an interest of the first person, and knowing the relationship of the first person to the second person (or third person), an advertisement may be selected based on the interests of the first person that is directed to the second person (or third person) (e.g., advertising toys to the father that would be of interest to the daughter, advertising jewelry to the husband that would be of interest to the wife, etc.).

In another example, a set of persons detected in a set of media objects, such as a set of photos or video clips, could be marketed a hard-bound picture book of photographic media objects of an event, or a DVD composite video. In the video example, relationships determined within each frame of video may allow the automatic generation of customized composite versions of the event for each user, maximized for that user's screen time, or the screen time of that user's spouse and children, etc.

In step 3506, the list of advertisements is filtered according to at least one of user profiles or communication preferences to generate a filtered list of advertisements. As shown in FIG. 36, advertisement filter 3604 receives list of advertisements 3612 and user information 3614. Advertisement filter 3604 may optionally filter list of advertisements 3612 according to user profile information and/or user communication preferences received in user information 3614 to reduce a number of advertisements listed in list of advertisements 3612. As shown in FIG. 36, advertisement filter 3604 generates filtered list of advertisements 3616.

In step 3508, one or more advertisements are selected from the filtered list of advertisements. As shown in FIG. 36, advertisement selector 3606 receives filtered list of advertisements 3616. Advertisement selector 3606 is configured to select one or more advertisements from filtered list of advertisements 3616 to be associated with media object 118. For example, advertisement selector 3606 may rank filtered list of advertisements 3616 (if not already ranked), and select a predetermined number of the highest ranked advertisements from the ranked list to be associated with media object 118. As shown in FIG. 36, advertisement selector 3606 generates a requested advertisements signal 3618, which indicates the selected one or more advertisements.

In step 3510, the selected one or more advertisements are provided for association with the received media object. As shown in FIG. 36, advertisement database 3304 receives requested advertisements signal 3618. Advertisement database 3304 generates a selected advertisements signal 3620, which includes the advertisements indicated by requested advertisements signal 3618. Media object metadata engine 104 receives selected advertisements signal 3620, and may be configured to associate the advertisements with media object 3308. For example, in one embodiment, media object packager 720 (e.g., FIGS. 7 and 22) may be configured to associate the advertisements with media object 3308 such that the advertisements are displayed in media object 3308 (when media object 3308 is an image or video) and/or may be played in media object 3308 (when media object is an audio recording). Alternatively, media object packager 720 may be configured to associate the advertisements with media object 3308 such that the advertisements may be displayed and/or played adjacent or nearby to (e.g., in a web page) the media object.

Referring to FIG. 34, media rights and representation marketplace and engine 3404 is configured to enable further marketing regarding media objects. For example, in an embodiment, media rights and representation marketplace and engine 3404 provides a content media marketing service, where each media object is analyzed for market value. If a media object is determined to have sufficient market value potential, the media object may be matched with one or more of media object publishers, sponsors, advertisers, and/or re-users of content. Media rights and representation marketplace and engine 3404 may define offered terms of the media object, as well as media licensing marketplace language for content consumption requests. Media rights and representation marketplace and engine 3404 may match the creators/owners of the media objects with content production, publication, or advertising, to generate revenue.

In further embodiments, other advanced services for media object re-use, re-publication, packaging, etc. can be marketed with the distribution of media objects, but the type of services is not limited. Media rights and representation marketplace and engine 3404 can be set to preference any number of variables to target users within or associated with media to become a channel for reaching users that could encompass any type of service or advertising.

For example, in an embodiment, persons detected to be present in a media object may be offered to purchase a copy of the media object by media rights and representation marketplace and engine 3404. Media rights and representation marketplace and engine 3404 may be optimized through user feedback gathered through instrumented sensor paths of users as well as using media object lifecycle graphs (which may include all known instances, interactions, re-uses, publications, etc. as well as all known users related to a media object).

Media object monetization engine 3302 of FIG. 33, media object monetization engine 3400, advertisement matching engine 3402, and media rights and representation marketplace engine 3404 of FIG. 34, media object monetization engine 3600, advertisement matcher 3602, advertisement filter 3604, and advertisement selector 3606 of FIG. 36, and/or flowchart 3500 of FIG. 35 may be implemented in hardware, software, firmware, or any combination thereof, including being implemented as computer code configured to be executed in one or more processors and/or as hardware logic/electrical circuitry.

IV. Example Computer Implementations

Figure 37:
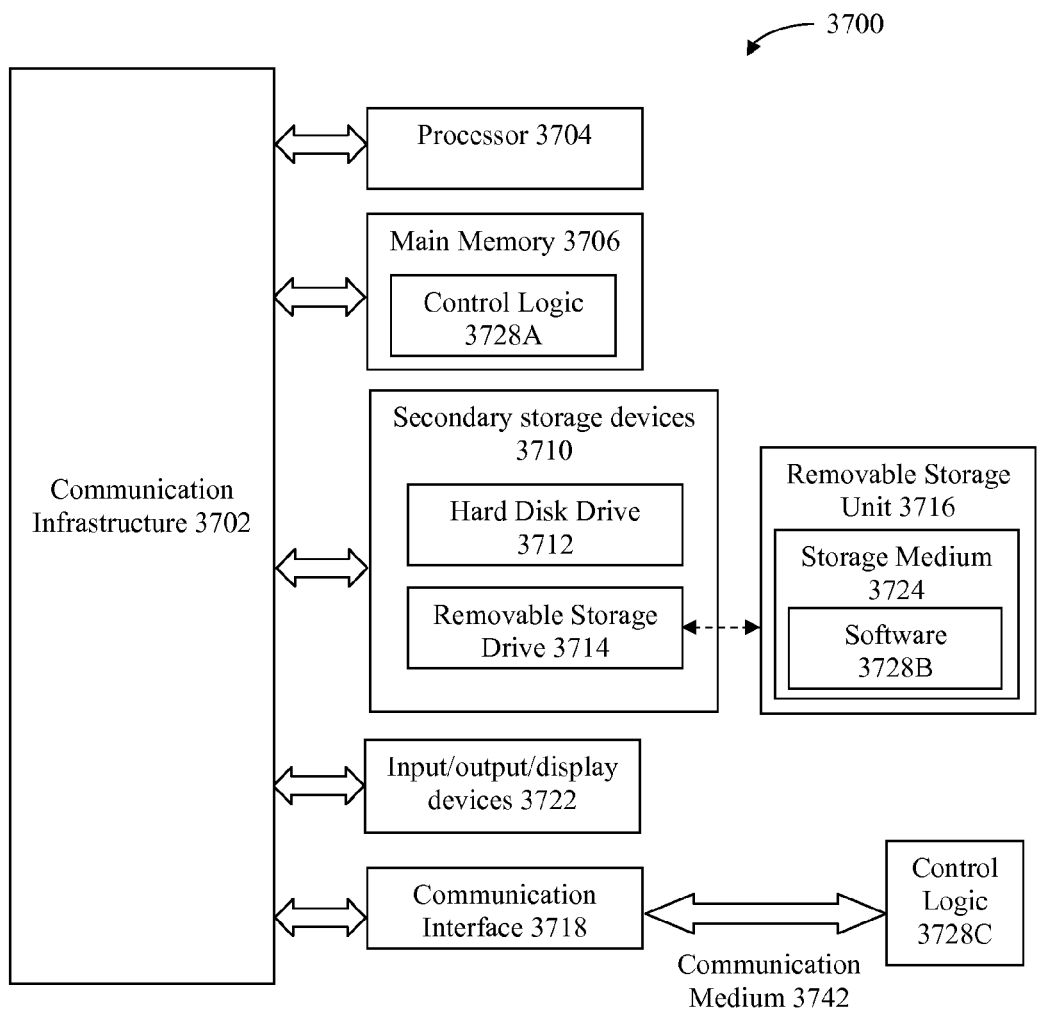
FIG. 37 shows a block diagram of an example computer system in which embodiments of the present invention may be implemented.

The embodiments described herein, including systems, methods/processes, and/or apparatuses, may be implemented using well known servers/computers, such as a computer 3700 shown in FIG. 37. For example, embodiments of media object metadata engine 104 shown in FIGS. 1-5, 7, and 22 and/or embodiments of media object monetization engine 3300 shown in FIGS. 33, 34, and 36 can be implemented using one or more computers 3700 (e.g., computer 404 shown in FIG. 4).

Computer 3700 can be any commercially available and well known computer capable of performing the functions described herein, such as computers available from International Business Machines, Apple, Sun, HP, Dell, Cray, etc. Computer 3700 may be any type of computer, including a desktop computer, a server, etc.

Computer 3700 includes one or more processors (also called central processing units, or CPUs), such as a processor 3704. Processor 3704 is connected to a communication infrastructure 3702, such as a communication bus. In some embodiments, processor 3704 can simultaneously operate multiple computing threads.

Computer 3700 also includes a primary or main memory 3706, such as random access memory (RAM). Main memory 3706 has stored therein control logic 3728A (computer software), and data.

Computer 3700 also includes one or more secondary storage devices 3710. Secondary storage devices 3710 include, for example, a hard disk drive 3712 and/or a removable storage device or drive 3714, as well as other types of storage devices, such as memory cards and memory sticks. For instance, computer 3700 may include an industry standard interface, such a universal serial bus (USB) interface for interfacing with devices such as a memory stick. Removable storage drive 3714 represents a floppy disk drive, a magnetic tape drive, a compact disk drive, an optical storage device, tape backup, etc.

Removable storage drive 3714 interacts with a removable storage unit 3716. Removable storage unit 3716 includes a computer useable or readable storage medium 3724 having stored therein computer software 3728B (control logic) and/or data. Removable storage unit 3716 represents a floppy disk, magnetic tape, compact disk, DVD, optical storage disk, or any other computer data storage device. Removable storage drive 3714 reads from and/or writes to removable storage unit 3716 in a well known manner.

Computer 3700 also includes input/output/display devices 3722, such as monitors, keyboards, pointing devices, etc.

Computer 3700 further includes a communication or network interface 3718. Communication interface 3718 enables the computer 3700 to communicate with remote devices. For example, communication interface 3718 allows computer 3700 to communicate over communication networks or mediums 3742 (representing a form of a computer useable or readable medium), such as LANs, WANs, the Internet, etc. Network interface 3718 may interface with remote sites or networks via wired or wireless connections.

Control logic 3728C may be transmitted to and from computer 3700 via the communication medium 3742.

Any apparatus or manufacture comprising a computer useable or readable medium having control logic (software) stored therein is referred to herein as a computer program product or program storage device. This includes, but is not limited to, computer 3700, main memory 3706, secondary storage devices 3710, and removable storage unit 3716. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing media object metadata engine 104 (FIGS. 1-5), media object intake manager 702, human representation detector 704, relation determiner 706, relationship predictor 708, and media object packager 710 shown in FIG. 7, human representation detector of FIG. 8 (including image/video analyzer 802, image recognition module 806, facial recognition module 808, audio analyzer 804, and/or voice recognition module 810), relation determiner 706 of FIG. 10 (including image/video analyzer 1002, image recognition module 1006, facial recognition module 1008, audio analyzer 1004, and/or voice recognition module 1010), relationship predictor 708 shown in FIG. 16 (including social relation graph generator 1602 and/or social relation graph comparator 1604), brand representation detector 2202, person-brand relation determiner 2204, and person-brand relationship predictor 2206 shown in FIG. 22, media object monetization engine 3302 of FIG. 33, media object monetization engine 3400, advertisement matching engine 3402, and media rights and representation marketplace engine 3404 of FIG. 34, media object monetization engine 3600, advertisement matcher 3602, advertisement filter 3604, and advertisement selector 3606 of FIG. 36, flowchart 600 of FIG. 6, step 1302 of FIG. 13, step 1402 of FIG. 14, step 1502 of FIG. 15, flowchart 1700 of FIG. 17, step 1902 of FIG. 19, flowchart 2100 of FIG. 21, step 2602 of FIG. 26, step 2702 of FIG. 27, step 2802 of FIG. 28, step 2902 of FIG. 29, and/or flowchart 3500 of FIG. 35 (including any one or more steps of flowcharts 600, 1700, 2100, 3500), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:
1. A computer-implemented method, comprising:
detecting, via a computing device, a representation of a first person captured in a media object that includes an image;
analyzing, via the computing device, the media object to determine at least one indicator of a relation between the first person captured in the media object and a second person associated with the media object, said at least one indicator of relation based, in part, upon analysis of the representation of the first person in the media object, said at least one indicator of relation comprising a factor of closeness representing a distance between the first person and second person, said second person not captured in the media object; and predicting, via the computing device, a relationship between the first person and the second person based at least on the determined at least one relation indicator.

2. The method of claim 1, wherein said analyzing comprises:
analyzing the image to determine at least one of the distance between the first person and an image capturing device used by the second person to capture the image, a facial expression of the first person in the image, a body expression of the first person in the image, clothing worn by the first person in the image, an activity of the first person in the image, a portion of the first person visible in the image, or a total number of persons in the image.

3. The method of claim 1, wherein said analyzing includes at least one of performing image recognition on the media object, or performing facial recognition on the media object.

4. The method of claim 1, wherein said predicting comprises:
predicting the relationship between the first person and the second person based at least on the determined at least one relation indicator and at least one of a time at which the media object was captured, a location at which the media object was captured, post-capture interaction data associated with the media object, or post-capture annotation of the media object.

5. The method of claim 1, further comprising:
associating data representative of the predicted relationship with the media object.

6. The method of claim 5, wherein said associating comprises:
instrumenting the media object with a contact link for at least one of the first person, the second person, or a third person associated with at least one of the first person or the second person.

7. The method of claim 1, further comprising:
selecting an advertisement based at least partially on the predicted relationship; and
associating the advertisement with the media object.

8. The method of claim 1, further comprising:
selecting an advertisement based at least partially on the predicted relationship; and
providing the advertisement for display to at least one of the first person, the second person, or a third person associated with at least one of the first person or the second person.

9. The method of claim 1, wherein said identifying comprises detecting representations of a plurality of persons captured in a media object;
wherein said analyzing comprises analyzing the media object to determine indicators of relations between the plurality of persons; and
wherein said predicting comprises predicting relationships between the plurality of persons based at least on the determined relations indicators.

10. The method of claim 9, further comprising:
generating a social relations graph based on the predicted relationships that includes a node corresponding to each person of the plurality of persons.

11. The method of claim 10, further comprising:
comparing the generated social relations graph with a plurality of network-based social relations graphs to determine a matching network-based social relations graph; and
determining an identity of at least one person of the plurality of persons from the determined matching network-based social relations graph.

12. A system, comprising:
at least one processor;
a media object metadata engine implemented by said at least one processor, said media object metadata engine comprising a human representation detector, a relation determiner, and a relationship predictor;
wherein the human representation detector is configured to detect a representation of a first person captured in a media object, the media object being an audio object;
wherein the relation determiner is configured to analyze the media object to determine at least one indicator of a relation between the first person captured in the media object and a second person associated with the media object, said at least one indicator of relation based, in part, upon analysis of the representation of the first person in the media object, said at least one indicator of relation comprising a factor of closeness representing a relationship distance between the first person and second person, said second person not captured in the media object; and
wherein the relationship predictor is configured to predict a relationship between the first person and the second person based at least on the determined at least one relation indicator.

13. The system of claim 12, wherein the audio object includes recorded voice of the first person and recorded voice of the second person.

14. The system of claim 13, wherein the relation determiner is configured to analyze the audio object to determine an attitude of the first person, an attitude of the second person, an activity of the first person, or an activity of the second person.

15. The system of claim 12, wherein the relation determiner is configured to perform voice recognition on the media object.

16. The system of claim 12, wherein the relationship predictor is configured to predict the relationship between the first person and the second person based at least on the determined at least one relation indicator and at least one of a time at which the media object was captured, a location at which the media object was captured, post-capture interaction data associated with the media object, or post-capture annotation of the media object.

17. The system of claim 12, wherein the media object metadata engine further includes a media object packager configured to associate data representative of the predicted relationship with the media object.

18. The system of claim 17, wherein the media object packager is configured to instrument the media object with a contact link for at least one of the first person, the second person, or a third person associated with at least one of the first person or the second person.

19. The system of claim 17, further comprising: a media object monetization engine configured to select an advertisement based at least partially on the predicted relationship; wherein the media object packager is configured to associate the advertisement with the media object.

20. The system of claim 17, further comprising:
a media object monetization engine configured to select an advertisement based at least partially on the predicted relationship;
wherein the advertisement is provided for display to at least one of the first person, the second person, or a third person associated with at least one of the first person or the second person.

21. The system of claim 12, wherein the human representation detector is configured to detect representations of a plurality of persons captured in the media object;
- wherein the relation determiner is configured to analyze the media object to determine indicators of relations between the plurality of persons;
- wherein the relationship predictor is configured to predict relationships between the plurality of persons based at least on the determined relations indicators; and
- wherein the relationship predictor includes a social relation graph generator configured to generate a social relations graph based on the predicted relationships that includes a node corresponding to each person of the plurality of persons.

22. The system of claim 21, wherein the relationship predictor further includes a social relation graph comparator configured to compare the generated social relations graph with a plurality of network-based social relations graphs to determine a matching network-based social relations graph; and
- wherein an identity of at least person of the plurality of persons is determined from the determined matching network-based social relations graph.

23. A computer-readable storage medium having computer program logic tangibly recorded thereon for enabling a processor, upon execution of the computer-program logic, to process a media object, comprising:
- computer instructions, upon execution by said processor, that detect a representation of a first person captured in a media object that includes an image;
- computer, instructions, upon execution by said processor, that analyze the media object to determine at least one indicator of a relation between the first person captured in the media object and a second person associated with the media object, said at least one indicator of relation based, in part, upon analysis of the representation of the first person in the media object, said at least one indicator of relation comprising a factor of closeness representing a distance between the first person and second person, said second person not captured in the media object; and
- computer instructions, upon execution by said processor, that predict a relationship between the first person and the second person based at least on the determined at least one relation indicator.

* * * * *